United States Patent
Shin et al.

(10) Patent No.: US 10,191,574 B2
(45) Date of Patent: Jan. 29, 2019

(54) FLEXIBLE ELECTRONIC DEVICE AND OPERATING METHOD THEREOF

(71) Applicant: Samsung Electronics Co., Ltd., Gyeonggi-do (KR)

(72) Inventors: Dongjun Shin, Seoul (KR); Heejin Kim, Seoul (KR); Sungyoun An, Gyeonggi-do (KR); Sun-Young Yi, Gyeonggi-do (KR); Chaekyung Lee, Seoul (KR); Ha-Young Jeon, Seoul (KR); Bo-Keun Kim, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 15/380,424

(22) Filed: Dec. 15, 2016

(65) Prior Publication Data
US 2017/0168625 A1    Jun. 15, 2017

(30) Foreign Application Priority Data
Dec. 15, 2015    (KR) .................. 10-2015-0179228

(51) Int. Cl.
*G06F 3/041*    (2006.01)
*G06F 1/16*    (2006.01)
(Continued)

(52) U.S. Cl.
CPC ............ *G06F 3/0412* (2013.01); *G06F 1/163* (2013.01); *G06F 1/1652* (2013.01); *G06F 3/0416* (2013.01); *G06F 3/04883* (2013.01); *H04M 1/0268* (2013.01); *G06F 2203/04101* (2013.01); *G06F 2203/04102* (2013.01);
(Continued)

(58) Field of Classification Search
CPC .. G06F 3/0412; G06F 3/0416; G06F 3/04883; G06F 1/163
See application file for complete search history.

(56) References Cited

U.S. PATENT DOCUMENTS

| 9,013,432 B2 | 4/2015 | Kang et al. |
| 2013/0120302 A1* | 5/2013 | Kang .................. G06F 3/041 345/173 |
| 2014/0028546 A1 | 1/2014 | Jeon et al. |
| 2014/0240264 A1 | 8/2014 | Im et al. |
| 2015/0022472 A1 | 1/2015 | Jung et al. |

(Continued)

FOREIGN PATENT DOCUMENTS

| KR | 1020150010516 | 1/2015 |
| WO | WO 2014/092437 | 6/2014 |

(Continued)

OTHER PUBLICATIONS

International Search Report dated Mar. 23, 2017 issued in counterpart application No. PCT/KR2016/014560, 10 pages.
(Continued)

*Primary Examiner* — Lisa Landis
(74) *Attorney, Agent, or Firm* — The Farrell Law Firm, P.C.

(57) ABSTRACT

Disclosed are a flexible electronic device and a display method, in which a method for operating the electronic device includes recognizing a wear state of the electronic device which comprises a flexible display, when the electronic device is worn, recognizing a multi-touch, a press, and/or a touch interaction comprising an additional interaction, and controlling a function and/or an object according to the touch interaction.

20 Claims, 35 Drawing Sheets

(51) Int. Cl.
*G06F 3/0488* (2013.01)
*H04M 1/02* (2006.01)
(52) U.S. Cl.
CPC ............. *G06F 2203/04104* (2013.01); *G06F 2203/04105* (2013.01); *G06F 2203/04806* (2013.01)

(56) References Cited

U.S. PATENT DOCUMENTS

| | | | |
|---|---|---|---|
| 2015/0049042 A1* | 2/2015 | Fujii | G06F 3/0416 345/174 |
| 2015/0105125 A1 | 4/2015 | Min et al. | |
| 2015/0185944 A1* | 7/2015 | Magi | G06F 1/1652 345/174 |
| 2015/0338979 A1* | 11/2015 | Rhee | G06F 3/0414 345/174 |
| 2015/0378391 A1* | 12/2015 | Huitema | G06F 1/163 361/679.03 |
| 2017/0160819 A1 | 6/2017 | Yi et al. | |
| 2017/0336964 A1* | 11/2017 | Kim | G06F 3/04883 |

FOREIGN PATENT DOCUMENTS

| WO | WO 2015/012449 | 1/2015 |
|---|---|---|
| WO | WO 2015/126123 | 8/2015 |

OTHER PUBLICATIONS

European Search Report dated Jul. 23, 2018 issued in counterpart application No. 16875990.0-1221, 9 pages.

\* cited by examiner

FLEXIBLE ELECTRONIC DEVICE AND OPERATING METHOD THEREOF

PRIORITY

The present application claims priority under 35 U.S.C. § 119(a) to a Korean Patent Application filed in the Korean Intellectual Property Office on Dec. 15, 2015, and assigned Serial No. 10-2015-0179228, the contents of which are incorporated herein by reference.

BACKGROUND

1. Field of the Disclosure

The present disclosure relates generally to an electronic device, and more particularly, a flexible electronic device and an operating method of the flexible electronic device.

2. Description of the Related Art

With recent advances in digital technology, various electronic devices such as mobile terminals, smart phones, tablet personal computers (PCs), personal digital assistants (PDAs), digital notes, notebooks, and wearable devices are widely used. The electronic device is reaching a mobile convergence phase such that it can now provide such functions such as voice call and video call, message delivery including short message service (SMS)/multimedia messaging service (MMS) and e-mail, digital note, camera, broadcasting play, video play, music play, Internet, messenger, game, and social network service (SNS) functions.

The electronic devices are designed in various forms including flexible device and wearable devices.

A flexible electronic device can advance to a wearable electronic device. The wearable electronic device can be donned (i.e., put on for wearing) by a user. Accordingly, the flexible electronic device can differ in shape before and after it is donned by the user, which makes it difficult for the user to achieve a consistent sizing of the electronic device for wearing.

SUMMARY OF THE INVENTION

An aspect of the present disclosure is to address at least the above-mentioned problems and/or disadvantages and to provide at least the advantages described below.

Another aspect of the present disclosure is to provide an apparatus and a method for performing a touch interaction suitable for a shape of a flexible electronic device which is worn.

Another aspect of the present disclosure is to provide an apparatus and a method for controlling a function and an object preset according to a touch input and a press while a flexible electronic device is worn.

Another aspect of the present disclosure is to provide an apparatus and a method for controlling a preset function and/or object by combining the number of multi-touch inputs, the number of detected presses, and additional interactions while a flexible electronic device is worn.

According to an aspect of the present disclosure, an electronic device can include a flexible display, an input interface comprising a touch panel which detects a touch input, a press sensor for detecting a press of the touch input, and a processor functionally coupled with the display, the input interface, and the press sensor, wherein the processor recognizes, when the electronic device is worn by a user, at least one of a multi-touch, a press, and a touch interaction comprising an additional interaction and controls at least one of a function and an object of the electronic device.

According to another aspect of the present disclosure, a method for operating an electronic device can include recognizing a wear state of the electronic device which comprises a flexible display, when the electronic device is worn, recognizing at least one of a multi-touch, a press, and a touch interaction comprising an additional interaction, and controlling at least one of a function and an object according to the touch interaction.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION OF EMBODIMENTS OF THE DISCLOSURE

Figure 1:
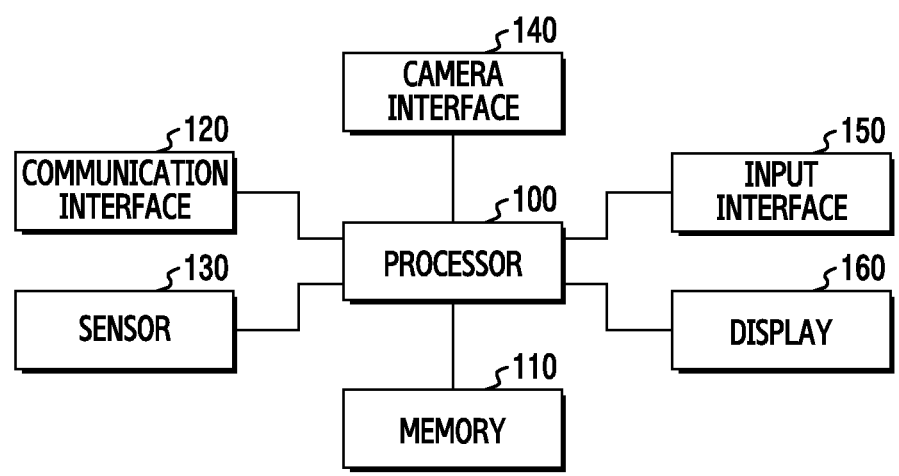
FIG. 1 illustrates an electronic device according to embodiments of the present disclosure.

Hereinafter, embodiments of the present disclosure are disclosed with reference to the accompanying drawings. However, it should be understood that is the embodiments are not intended to limit the present disclosure to a particular form but, on the contrary, to cover various modifications, equivalents, and/or alternatives of the embodiments of the present disclosure. In relation to descriptions of the drawings, like reference numerals can be used for similar components. A description of known configurations and/or functions will be omitted for the sake of clarity and conciseness.

In the disclosure, expressions such as "have", "can have", "include" or "can include" refer to the presence of a corresponding characteristic, such as a number, function, operation, or component, and do not exclude presence of an additional characteristic.

In the disclosure, expressions such as "A or B", "at least one of A or/and B", and "one or more of A or/and B" can include any combination of these items. For example, "A or B", "at least one of A and B", and "at least one of A or B" can indicate any of (1) including at least one A, (2) including at least one B, and (3) including both at least one A and at least one B.

Terms such as "first," "second," "primarily," or "secondary" used herein can represent various elements regardless of order and/or importance and do not limit corresponding elements. Such terms are used for distinguishing one element from another element. For example, a first user device and a second user device can represent different user devices regardless of order or importance, a first element can be referred to as a second element without deviating from the scope of the present disclosure, and similarly, a second element may be referred to as a first element.

When a first element is "operatively or communicatively coupled with/to" or "connected to" another element, such as a second element, it should be understood thin the first element can be directly connected to the second element or can be connected to the second element through a third element.

An expression "configured to (or set)" used in the present disclosure can be used interchangeably with "suitable for," "having the capacity to," "designed to," "adapted to," "made to," or "capable of," for example, according to a situation. The expression "configured to (or set)" may not always indicate "specifically designed to" by hardware. Instead, in some situations, an expression "apparatus configured to" can indicate that the apparatus "can" operate together with another apparatus or other components. For example, "a processor configured (or set) to perform A, B, and C" can be a dedicated processor for performing a corresponding operation or a generic-purpose processor, such as a central processing unit (CPU) or an application processor (AP) which can perform a corresponding operation by executing one or more software programs stored in a memory device.

Terms used in the present disclosure are used for only describing a specific embodiment and are not intended to limit the scope of other embodiments. A singular form can include a plurality of forms unless it is explicitly differently represented. All the terms used herein, including technical and scientific terms, can have the same meanings as terms that are generally understood by those skilled in the art. The terms defined in a general dictionary can be interpreted to have the same or similar meanings as in the context of the relevant art, and, unless explicitly defined herein, terms in this disclosure shall not be interpreted ideally or excessively as formal meanings. In some cases, even the terms defined in this disclosure cannot be interpreted to exclude the embodiments of the present disclosure.

An electronic device according to embodiments of the present disclosure can include at least one of a smart phone, a tablet personal computer (PC), a mobile phone, a video phone, an e-book reader, a desktop PC, a laptop PC, a netbook computer, a workstation, a sever, a personal digital assistant (PDA), a portable multimedia player (PMP), an motion pictures experts group (MPEG) 3 (MP3) player, a mobile medical equipment, a camera, and a wearable device. The wearable device can include at least one of an accessory type, such as a watch, a ring, a bracelet, an ankle bracelet, a necklace, glasses, a contact lens, or a head-mounted-device (HMD), a fabric or clothing embedded type, such as electronic garments, a body attachable type, such as a skin pad or a tattoo, and an implantable circuit. The wearable device can be a flexible device.

Hereinafter, an electronic device according to embodiments will be described with reference to the accompanying drawings. The term "user", as used herein, can refer to a person using an electronic device or an artificial intelligence electronic device. The electronic device according to embodiments of the present disclosure is a flexible, foldable electronic device and can be a wearable electronic device.

FIG. 1 illustrates an electronic device according to embodiments of the present disclosure. The electronic device of FIG. 1 can be a flexible, wearable electronic device. Referring to FIG. 1, the electronic device can include a processor 100, a memory 110, a communication interface 120, a sensor 130, a camera 140, an input interface 150, and a display 160. According to an embodiment, the electronic device can omit at least one of the components or further include at least one additional component. In the electronic device of FIG. 1, the input interface 150 and the display 160 are flexible devices and can be an integral touch screen or a touch screen sensor. All or some of the processor 100, the memory 110, the communication interface 120, the sensor 130, and/or the camera 140 can be configured as at least one flexible printed circuit board (PCB). The PCB can be curved, bent, rolled, or folded together with the flexible screen. Hereafter, the term 'bend' refers to any of curve, roll, and fold.

The processor 120 can include one or more of a CPU, an AP, and a communication processor (CP), and can process an operation or data when controlling at least another component of the electronic device and/or executing an application.

The memory 130 can include a volatile and/or nonvolatile memory, can store commands or data relating to at least other component of the electronic device, and can store software and/or a program such as a kernel, middleware, an application programming interface (API), and/or an application program (hereinafter, "application"). At least part of the kernel, the middleware, or the API can be referred to as an operating system (OS).

The communication interface 120 can include a wireless and a wired communication module. The wireless communication module can include a cellular communication module and a short-range communication module.

The cellular communication module can adopt at least one of long term evolution (LTE), LTE-advanced (LTE-A), code division multiple access (CDMA), wideband CDMA (WCDMA), universal mobile telecommunications system (UMTS), wireless broadband (WiBro), and global system for mobile communications (GSM). The cellular communication module can provide a voice call, a video call, a text service, or an Internet service over a communication network, and can identify and authenticate the electronic device in the communication network by using a subscriber identification module (SIM) card.

The cellular communication module can perform at least part of functions of the processor 100, and can further include the CP.

The short-range communication module can include at least one of wireless fidelity (WiFi), Bluetooth®, near field communication (NFC), and global navigation satellite system (GNSS) or global positioning system (GPS). Magnetic secure transmission (MST) can generate a pulse according to transmit data using an electromagnetic signal, and the pulse can generate a magnetic signal. The electronic device sends the magnetic signal to a point of sale (POS) terminal, and the POS terminal detects the magnetic signal using an MST reader and restores data by converting the detected magnetic signal to an electric signal. The GNSS can include at least one of GPS, GLONASS, Beidou navigation satellite system (Beidou), or Galileo (the European global satellite-based navigation system), according to use area or bandwidth of the GNSS. Hereafter, GPS can be interchangeably used with the GNSS.

The wired communication module can include at least one of universal serial bus (USB), high definition multimedia interface (HDMI), recommended standard 232 (RS-232), and plain old telephone service (POTS).

The sensor 130 can measure physical quantities or detect an operating state of the electronic device and thus convert the measured or detected information into electrical signals. The sensor 130 can include at least one of such sensors as a gesture, gyro, barometric, magnetic, acceleration, grip, proximity, color, such as a red, green, blue (RGB), medical, biometric, temperature-humidity, illuminance, ultra violet (UV), and flexibility sensor for detecting the bending of the electronic device.

According to embodiments of the present disclosure, when the display 160 is a flexible display, the sensor 130 can include a bending sensor for detecting the flex or the bending of the electronic device. The bending sensor can be disposed at or near a wear state providing device of the electronic device. The sensor 130 can include a coupling sensor enabling the electronic device to recognize the wearable electronic device when worn. The coupling sensor can be installed in a coupling unit and can include a magnetic sensor which detects whether the device is worn by arranging a magnet of an opposing pole at each end of the coupling unit and detecting variation of a magnetic field according to the coupling/decoupling. The coupling sensor can include a proximity sensor which is disposed in the coupling unit and detects whether the coupling unit approaches the electronic device. The medical sensor of the sensor 130 can include a heart rate monitoring (HRM) sensor and/or a UV sensor. The HRM sensor can be installed on a rear side of the electronic device, such as on a surface contacting a user's wrist. The UV sensor can be installed on a front side of the electronic device, such as at a position for detecting an external light such as sunlight.

Additionally or alternately, the sensor 130 can further include a control circuit for controlling at least one sensor therein. According to an embodiment, the electronic device can further include, as part of the processor 100 or individually, a processor configured to control the sensor 130 such as while the processor 100 is in a sleep mode.

The camera unit 140 is for capturing still and moving images, and can include one or more image sensors, such as a front sensor and a rear sensor, a lens, an image signal processor (ISP), or a flash, such as a light emitting diode (LED) or a xenon lamp.

The input interface 150 can include at least one of a touch panel, a (digital) pen sensor, a key, and an ultrasonic input interface. The touch panel can use at least one of capacitive, resistive, infrared, and ultrasonic methods and may further include a control circuit and a tactile layer that provides a tactile response to the user. The (digital) pen sensor can include part of a touch panel or a separate sheet for recognition. The key can include a physical button, an optical key, or a keypad. The ultrasonic input interface can detect ultrasonic waves from an input tool through a microphone and thus obtain data corresponding to the detected ultrasonic waves. The input interface 150 can be the touch panel, which can include a press sensor function.

The display 160 can include a liquid crystal display (LCD), an LED display, an organic light emitting diode (OLED) display, a microelectromechanical systems (MEMS) display, or an electronic paper display. The display 160 can display various contents to the user, such as texts, images, videos, icons, or symbols.

The input interface 150 and the display 160 can each be configured as an integral touch screen that can display a screen under control of the processor 100, and detect a touch, gesture, proximity, or hovering input by using an electronic pen or a user's body part.

The input interface 150 and the display 160 can be configured as a flexible device.

In embodiments of the present disclosure, the wearable electronic device can be included in a category of the electronic device, and any known connection may operate between the wearable device and a variety of electronic devices. For example, the wearable electronic device in embodiments of the present disclosure can include all devices (such as information communication device, multimedia device, wearable device and application device) using one or more of various processors including an AP, a CP, a graphic processing unit (GPU), and a CPU.

The flexible electronic device can be a bendable electronic device and the wearable electronic device can be worn by the user. The electronic device can be flexible and wearable electronic device. Herein, the flexible electronic device and the wearable electronic device are synonymous.

The wearable electronic device being connected with another electronic device may perform a function corresponding to the electronic device according to the connection to or disconnection from the electronic device.

The processor 100 can control application execution using the memory 110. The application can include one or more applications for performing functions such as a home, dialer, SMS/MMS, an instant message (IM), browser, camera, alarm, contact, voice dial, e-mail, calendar, media player, album, watch, health care (such as measure an exercise amount or blood sugar level), or environmental information provision application, such as for providing air pressure, humidity, or temperature information.

According to one embodiment, the application can include an information exchange application for supporting information exchange between the electronic device and an external electronic device (another electronic device). The information exchange application can include a notification relay application for relaying specific information to the external electronic device, or a device management application for managing the external electronic device.

For example, the notification relay application can forward notification information generated from another application (such as the SMS/MMS application, the e-mail application, the health care application, and the environmental information application) of the electronic device to the external electronic device. The notification relay application can receive and forward notification information from the external electronic device to the user.

The device management application can install, delete, or update at least one function, such as turn-on/turn off all or part of the external electronic device itself or display brightness adjustment of the external electronic device communicating with the electronic device, an application operating in the external electronic device, or a service provided from the external electronic device.

According to one embodiment, the application can include a designated application, such as a health care application of a mobile medical device, according to a property of the external electronic device, an application received from the external electronic device, and a preloaded application or a third party application which can be downloaded from the server.

In embodiments of the present disclosure, a hardware approach will be described as an example. However, since the embodiments of the present disclosure include a technology using both hardware and software, the present disclosure does not exclude a software-based approach.

Figure 2:
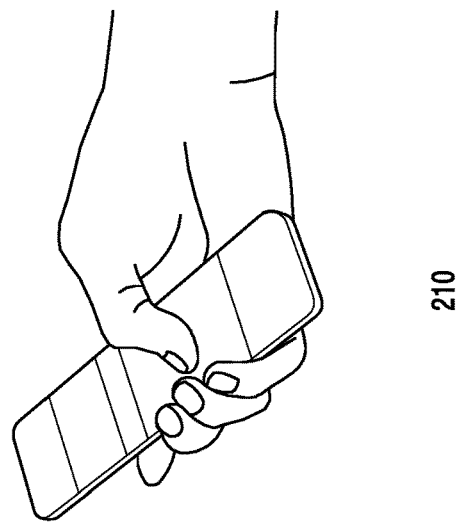
FIG. 2 illustrates morphological changes of a flexible electronic device according to embodiments of the present disclosure.
Figure 2:
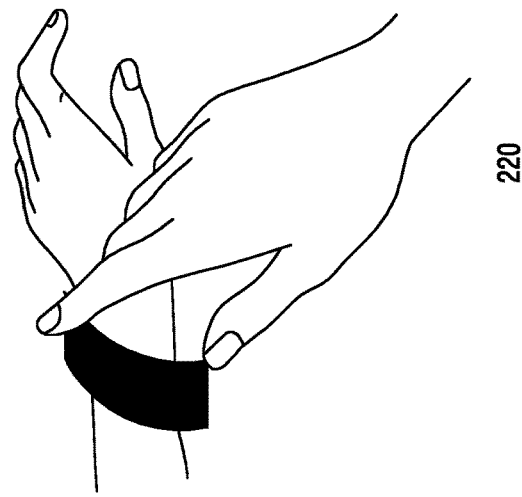
Figure 2:
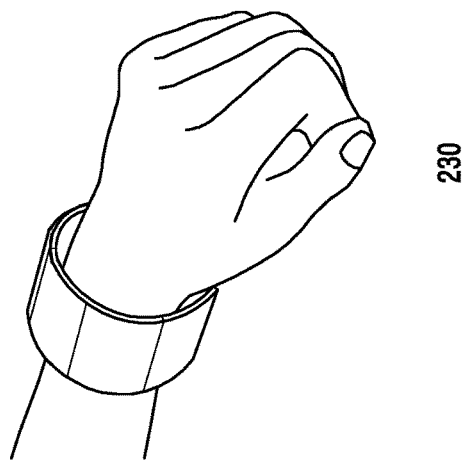

FIG. 2 illustrates morphological changes of a flexible electronic device according to embodiments of the present disclosure.

Referring to FIG. 2, the electronic device can be used as a typical portable device in a non-wear state 210 and as a wearable electronic device in a wear state 230. When switching from the non-wear state 210 to the wear state 230 or from the wear state 230 to the non-wear state 210, the electronic device is attached to or detached from a user's body part, such as a wrist, in a state 220. In particular, when switching from the non-wear state 210 to the wear state 230, the user can bend and attach the electronic device to his/her body part in the state 220.

The flexible electronic device according to embodiments of the present disclosure can be worn or removed. In the morphological change, such as when the electronic device is curved or unfolded, the electronic device can determine its state and switch to an appropriate function and/or user interface (UI) after the morphological change. For example, in the state 220 from the non-wear state 210 to the wear state 230, the electronic device can activate a preset function and/or UI so as to smoothly and rapidly execute the operation of the non-wear state 210 in the wear state 230.

Figure 3A:
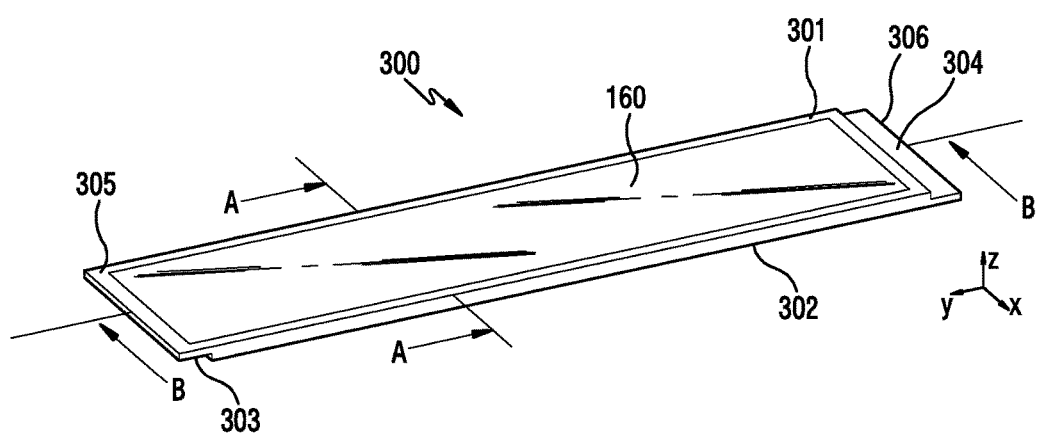
FIGS. 3A, 3B, 3C, 3D, 3E, 3F, 3G, and 3H illustrate a structure of a flexible electronic device according to embodiments of the present disclosure.
Figure 3B:
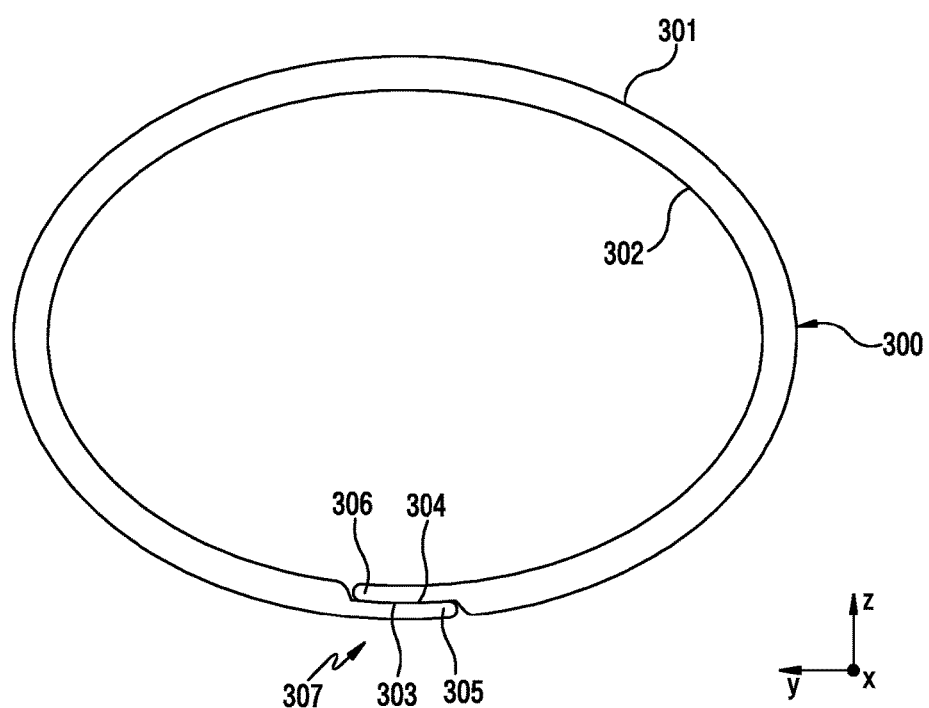

FIG. 3A is a perspective view of a flexible electronic device of a flat state according to embodiments of the present disclosure. FIG. 3B is a front view of a flexible electronic device worn on a wrist according to embodiments of the present disclosure.

Referring to FIG. 3A and FIG. 3B, the flexible electronic device can be worn on a particular body part such as a wrist or an arm. FIG. 3A shows a first position state of the flexible electronic device before it is worn, and FIG. 3B shows a second position state of the flexible electronic device in the worn position. In the first position, the flexible electronic device is nearly flat. In the second position, the flexible electronic device is placed on the wrist by force. A power source which provides the force shall be described.

The flexible electronic device according to embodiments can include one main body 300 that is in a roughly band shape longitudinally extending in one direction and can include a first side 301 and a second side 302 which is opposite to the first side 301. The first side 301 can be, as an outer and upper side of the flexible electronic device, a display area. The second side 302 can be an inner and lower side of the flexible electronic device, that is, a side contacting the skin. The main body 300 is a main body of the flexible electronic device and can be curved, bent, rolled, and folded. Accordingly, the flexible electronic device can be worn in the manner of a watch on the wrist. The main body 300 can have a wear function for wearing on the wrist.

The main body 300 can include the display 160 on the first side 301. The display 160 can be a flexible display and is referred to as the flexible display. The flexible display 160 can be curved, bent, or folded together with the main body 300.

Figure 3C:
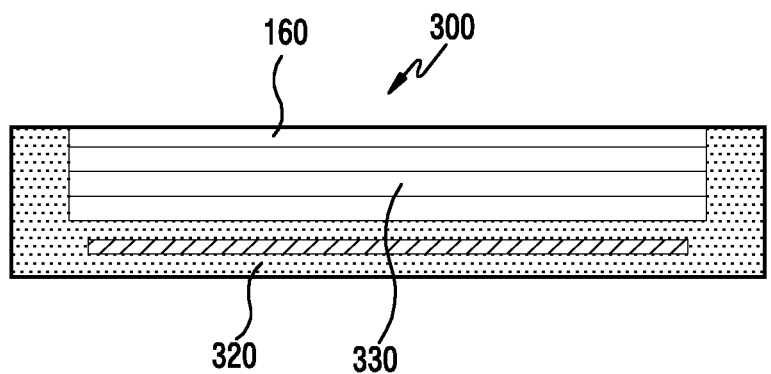

The flexible electronic device according to embodiments can include the main body 300, the flexible display 160, and a wear state providing device 320, as illustrated in FIG. 3C.

Although not depicted in the drawings, a speaker, a microphone, a front camera, and/or at least one sensor can be disposed in another area than the display area, such as in a bezel area on the front side 301 of the main body 300.

The flexible display 160 on the first side 310 of the flexible electronic device can include a touch screen or a touch screen sensor including a touch panel. The touch screen can occupy most of the front side 310 of the flexible electronic device.

A home button can be included in the main body 300. When the home button is pressed, the flexible display can display a main Home screen. For example, a power/reset button, a volume button, and one or more microphones can be disposed along edges of one side of the flexible electronic device, a connector can be formed on the other side of the flexible electronic device and can include a plurality of electrodes for wired connection with an external device, and an earphone jack can be disposed on the side of the flexible electronic device, into which an earphone can be inserted.

The main body 300 of the flexible electronic device according to embodiments can be worn on the wrist using the wear state providing device 320. For example, a casing part which is bent in the main body 300 can be formed with a flexible material, such as a thin steel spring.

The flexible display 160 according to embodiments is formed with a flexible material and can be spread out, rolled up, folded, or bent.

The main body 300 according to embodiments can include a main board and electronic parts mounted on the main board. The main board can have a joint structure using a flexible circuit unit and can be constructed as shown in FIG. 1. In addition, the main body 300 according to embodiments can include a flexible battery.

The flexible electronic device according to embodiments can include a coupling unit 307 which indicates a part which connects both ends of the main body 300 and thus provides a structure or a force for the wearing on the wrist. The coupling unit 307 can include a first main body end portion 305 and a second main body end portion 306. The first end portion 305 can indicate one end of the main body 300, and the second end portion 306 can indicate the other end which is opposite to the first end portion 305.

The coupling unit 307 can be formed in various shapes with various materials, has an uneven structure, and can provide a coupling force using a magnetic force of the magnetic material. The first end portion 305 can include a first recess 303 on the second side 302, and the second end portion 306 can include a second recess 304 on the first side 301. The first recess 303 and the second recess 304 each can be formed in a groove shape and include a step from the second side 302 and the first side 301, respectively. For example, when the first recess 303 and the second recess 304 are engaged, the first recess 303 can be coupled with at least part of the second end portion 306 and the second recess 304 can be coupled with at least part of the first end portion 305. For example, when the first end portion 305 and the second end portion 306 are engaged, the first recess 303 can receive and engage at least part of the second end portion 306 and the second recess 304 can receive and engage at least part of the first end portion 305. The thickness of the coupling unit 307 can be approximately the same as the thickness of the main body 300 excluding the coupling unit 307.

The coupling unit 307 according to embodiments can apply the connection force using magnetic materials of opposing polarities or using a magnetic material and a metallic material. For example, when the first end portion 305 includes a north-pole magnetic material and the second end portion 304 includes a south-pole magnetic material, with the flexible electronic device worn, a pull force can act between the first end portion 305 and the second end portion 306 and thus provide the coupling force between the first end portion 305 and the second end portion 306. For example, when the first end portion 305 includes a north/south-pole magnetic material and the second end portion 304 includes a metallic material, with the flexible electronic device worn, the first end portion 305 and the second end portion 306 can be coupled by the magnetic force.

Figure 3D:
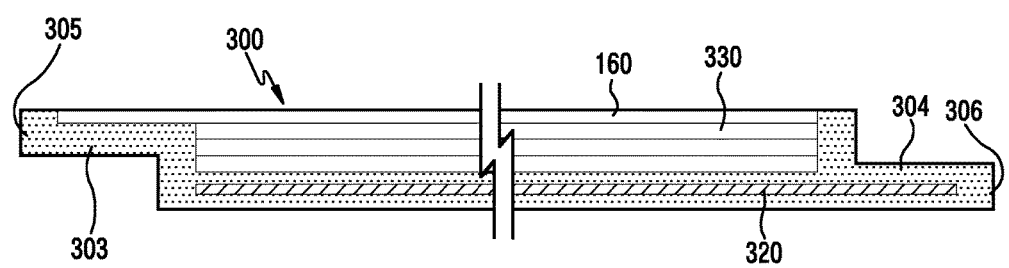

FIG. 3C is a cross-sectional view of the flexible electronic device along a line A-A of FIG. 3A. FIG. 3D is a cross-sectional view along a line B-B of FIG. 3A.

Referring to FIGS. 3C and 3D, the flexible electronic device according to embodiments can include the wear state providing device 320 for mounting the main body 300 on the wrist.

The wear state providing device 320 can operate semi-automatically. For example, when a force is exerted to the wear state providing device 320 in the first position of FIG. 3A, the flexible electronic device can wrap around the wrist in the second position of FIG. 3B. For example, the wear state providing device 320 can include a metallic thin plate. While the wear state providing device 320 is nearly flat, when the flexible electronic device is placed on the wrist and a force is exerted to curve around the wrist, the wear state providing device 320 can provide a force for bending to cover the wrist. The main body 300 wraps around the wrist by means of the wearing device 320, and accordingly, the flexible electronic device can be worn on the wrist. The wear state providing device 320 can have curvature.

When the main body 300 including the wear state providing device 320 is detached from the wrist with a force, the main body 300 can become flat as shown in FIG. 3A due to a restoring force of the wear state providing device 320.

A PCB assembly (PCBA) 330 can be formed with a flexible material or in a joint structure.

Figure 3E:
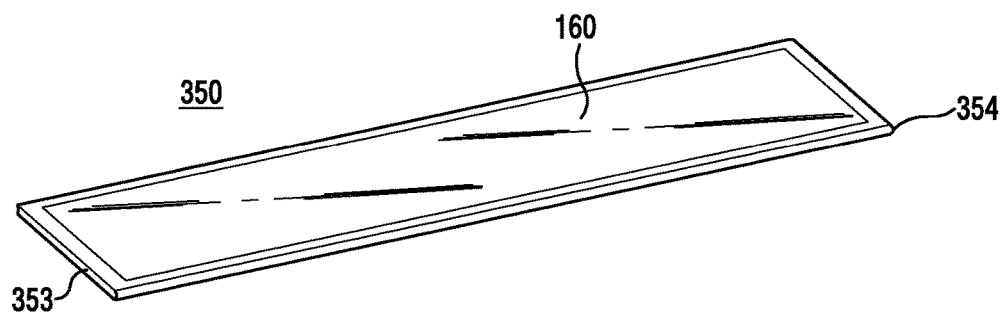
Figure 3F:
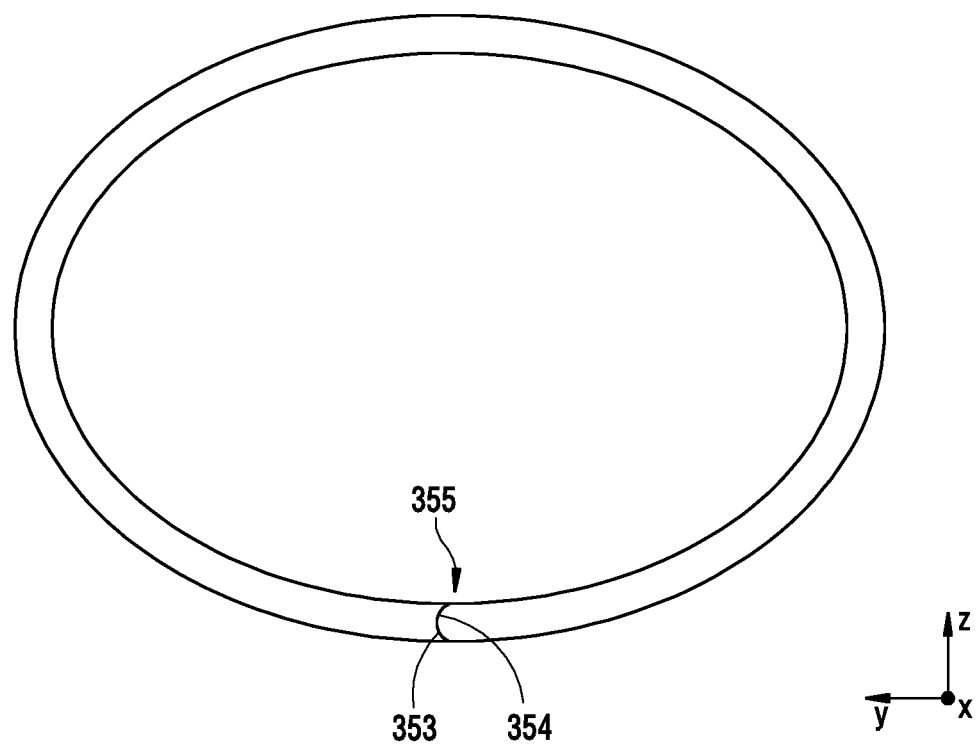

Referring to FIGS. 3E and 3F, the flexible electronic device according to embodiments can include a main body 350, and a coupling unit 355 for coupling a first end portion 353 and a second end portion 354 of the main body 350. The coupling unit 355, in an uneven structure, can include a first coupling portion formed in the first end portion 353 and a second coupling portion formed in the second end portion 354. For example, the first coupling portion can be concave and the second coupling portion can be convex, or the second coupling portion can be concave and the first coupling portion can be convex.

The coupling unit 355 according to embodiments can provide the coupling force using magnetic materials of opposing polarities, or using a magnetic material and a metallic material. For example, when the first end portion 353 includes a north-pole magnetic material and the second end portion 354 includes a south-pole magnetic material, with the flexible electronic device worn, the pull force can act between the first end portion 353 and the second end portion 354 and thus provide the coupling force between the first end portion 353 and the second end portion 354. For example, when the first end portion 353 includes a north/south-pole magnetic material and the second end portion 354 includes a metallic material, with the flexible electronic device worn, the pull force can provide the coupling force between the first end portion 353 and the second end portion 354.

Figure 3G:
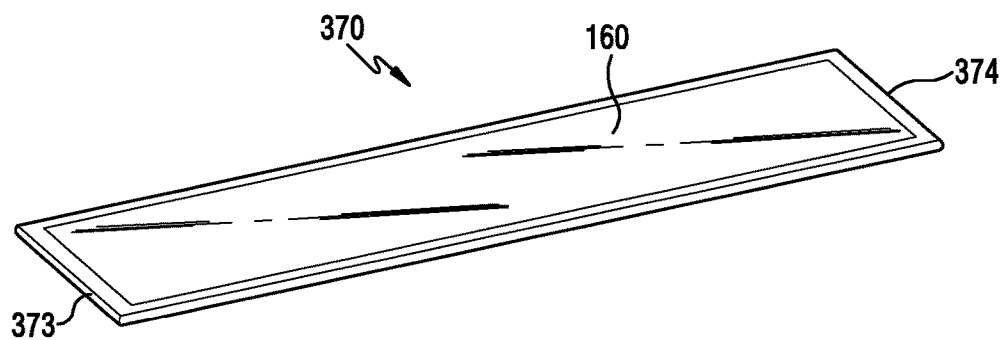
Figure 3H:
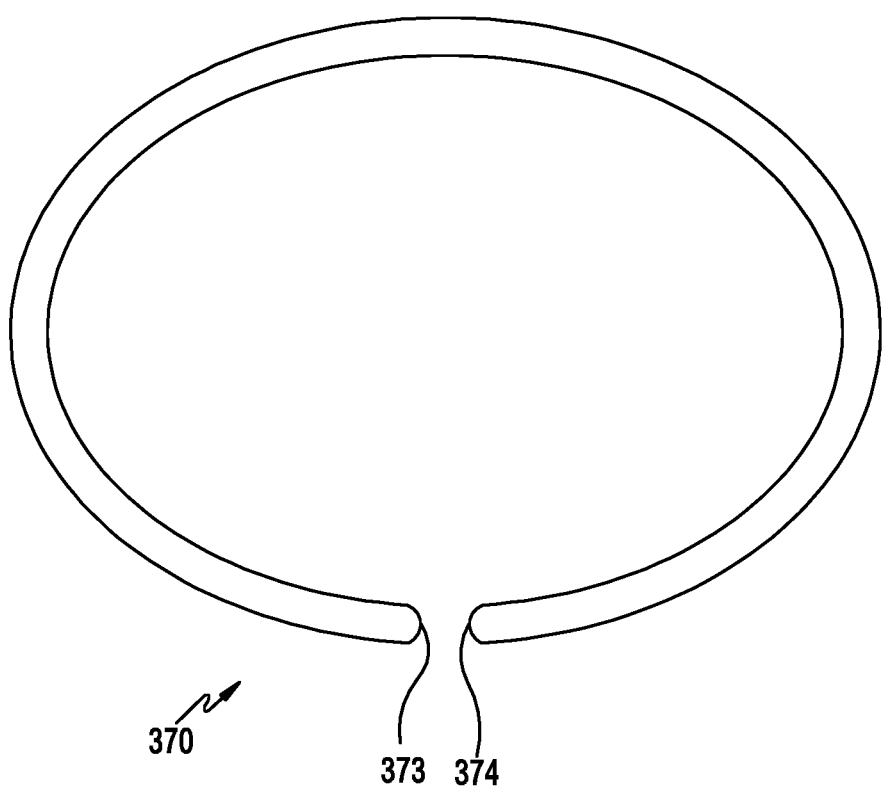

Referring to FIGS. 3G and 3H, the flexible electronic device according to embodiments can include a main body 370, a first end portion 373, and a second end portion 374 of the main body 370. When the flexible electronic device is worn by the user, the first end portion 373 and the second end portion 374 do not meet and thus the coupling unit may not be constructed. The first end portion 373 and the second end portion 374 can be disposed in proximity. When the flexible electronic device is worn, the main body 370 can wrap around the wrist and thus can be worn on the wrist.

The flexible electronic device according to embodiments can be implemented in various manners. While the wear state providing device 320 is formed with the flexible material in FIGS. 3A, 3B, 3C, 3D, 3E, 3F, 3G, and 3H, the main body can include a plurality of connecting members and hinges for interlinking the connecting members below the flexible touch screen, and thus, the flexible electronic device can be curved around the user's body part. In this case, the connecting members can include a PCB including the components of FIG. 1. The main body below the flexible touch screen may include grooves and protrusions enabling the electronic device to be curved around the user's body part.

It has been described that the coupling units of the flexible electronic device according to embodiments are implemented using the magnet. However, the coupling unit of the flexible electronic device may be formed with a coupling material such as a hook or a buckle, or with a coupling member of a ring type, such as a fastening of a leather watch strap. The flexible electronic device can include a coupling sensor at or near the coupling unit.

The flexible electronic device according to embodiments can be used in the wear state and the non-wear state. The electronic device of the wear state can contact the user's body part, and accordingly, the touch panel of the display 160 and the input interface 150 can be limited in use. For example, when the electronic device is worn on the wrist, a visible area of the display 160 can be part of the display 160. In this case, a touch panel area for the touch interaction of the user can be an area visible to the user. Hence, it can be necessary to enhance a method for recognizing the touch interaction in the electronic device of the wear state. The electronic device can control its function and/or object by combining locations and the number of touches, the number and locations of presses exerted on the touches, and touch interactions, such as gestures and/or motions. When the electronic device is worn, the user can wear the electronic device by bending the electronic device. In so doing, the user may touch and bend the electronic device by exerting the press. Thus, when detecting the press over a certain level, the electronic device can recognize as the user's an intention to wear the electronic device.

The input interface 150 of the electronic device according to embodiments can include a touch panel which can have functionality for recognizing the touch press. The electronic device can also include a press sensor or an independent press sensor, such as a piezo sensor, and a touch panel for detecting the press.

The touch panel can detect a touch and/or hovering input and can determine the level of the press or force exerted on the touch panel (hereinafter, "press" and "force" are synonymous). For example, the electronic device can determine the press level based on a contact area (or a change in shape or size of the contact area) on the surface of the touch panel. That is, the size of the touch area can change according to the exerted press, and the electronic device can approximate and estimate the exerted press or size the change according to the touch area.

The touch panel can include components of the press sensor for detecting the press. For example, the press sensor can emit light to a lower position of the touch panel and detect the press by analyzing the amount of light change based on the touch press, and can detect the touch press by attaching a film, such as a transparent press sensitive layer, for detecting the press below the touch panel.

Using the touch panel and the press sensor, the electronic device can measure the input location and the press level of the touch on the touch panel, and can recognize a user's touch input location through the touch panel and recognize the press level through the press sensor.

The touch panel for detecting the press can include a plurality of electrodes, such as first and second electrodes, and transparent press sensitive layers disposed between the first and second electrodes, which are transparent conductive traces and can be implemented using patterned layers. The conductive traces each can include tabs, such as drive channels and sensing channels, for providing electrical connection to another circuit.

The first electrodes of the press sensor of the touch panel can be arranged on the transparent press sensitive layer, and the conductive traces can be arranged in a first direction, such as along and/or in parallel with the X-axis of the touch panel (such as FIG. 3A). The second electrodes can be arranged below the transparent press sensitive layer, and the conductive traces can be arranged in a second direction, such as along and/or in parallel with the Y-axis of the touch panel (such as FIG. 3A). The conductive traces of the first and second electrodes can be arranged orthogonally.

Due to the orthogonal orientation of the conductive traces, the conductive traces of the electrodes can overlap along the Z-axis of the touch panel (such as FIG. 3A). At every position, a plurality of conducting paths can be constructed from the conductive traces of the first electrodes to the conductive traces of the second electrodes through the transparent press sensitive layer. The first and second electrodes can form an m×n array (or matrix) of potential conducting paths through the transparent press sensitive layer. Herein, m can denote the number of columns or rows of the conductive traces of the first or second electrodes, and n can denote the number of rows or columns of the conductive traces of the second electrodes or the first electrodes.

The transparent press sensitive layer can be formed with elastic materials on which transparent conductive particles are uniformly dispersed. The transparent press sensitive layer can include a transparent elastomeric matrix, such as polyester or silicone rubber, and transparent conductive particles, such as indium tin oxide or tin oxide, can be dispersed within the material. When the press is exerted on the touch panel, such as in the Z-axis direction, the transparent press sensitive layer can be compressed and thus an average distance between the particles dispersed within the transparent press sensitive layer can be reduced. That is, a density of the conducting path formed by adjacent particles can increase, due to percolation, and thus conductance of the transparent press sensitive layer can increase as resistance decreases.

The transparent press sensitive layer can act as a variable resistance which is electrically in series with each conducting path between the electrodes. That is, the amount of the resistance for each conducting path can be directly related to the level of the press applied to the touch panel at the location corresponding to the respective conducting path, i.e., the location on the conducting path along the Z-axis. The press applied to the touch panel surface corresponding to the respective conducting path (i.e., the location overlying conducting path along the Z-axis) can be detected by measuring or determining the resistance or change in resistance for each conducting path of the plurality of the conducting paths, that is, for each location of the m×n array. Based on the resistance for each conducting path, a press metric for each conducting path can be obtained and can indicate the level of the press applied to the touch panel on each conducting path.

The electronic device can apply a reference voltage or current to the conductive traces of the first electrodes and measure the voltage or current at the conductive traces of the second electrodes. That is, the electronic device can scan each conducting path, such as every position in the m×n array. The measured voltage or current for each conductive trace of the second electrodes can depend on a resistance of the transparent press sensitive layer between the conductive traces of the first electrodes, such as the press level of the touch on the touch panel, and the conductive traces of the second electrodes. The measured voltage or current can be related to the voltage of the press applied along the Z-axis by the overlapping of the conductive traces of the first and second electrodes.

As such, the touch panel can include the press sensor. Upon detecting the touch input, the electronic device can measure a press value, such as a voltage of the touch input and process the press value as a simple touch input based on the measured press value. According to the magnitude of the press value, the electronic device may process the touch input with another function. The electronic device including the touch panel having the press sensor function can perform another operation according to the input touch level, such as the press. For example, when a user's touch is input to the touch panel and the measured voltage of the touch input is below a threshold voltage Th1, the electronic device can process the touch input according to two-dimensional location information. When the measured voltage is between the threshold voltage Th1 and a voltage Th2, the electronic device can process a preset function according to the measured press value.

When the user exerts at least one press on the touch panel, the electronic device can obtain measured voltages of the corresponding press, map two-dimensional location information of the press, and thus determine the location and the press value of each press signal. When the location of the detected press signal changes, such as when the user moves his/her finger while pressing the touch panel, the electronic device can determine a movement direction based on the detected press location change. For example, the electronic device can detect the movement directions of the press signals including the input gesture and use contents displayed in a screen as signals for control and/or manipulation. The level of the control and/or manipulation can be determined based on the movement level and/or direction of the detected press value.

Figure 4:
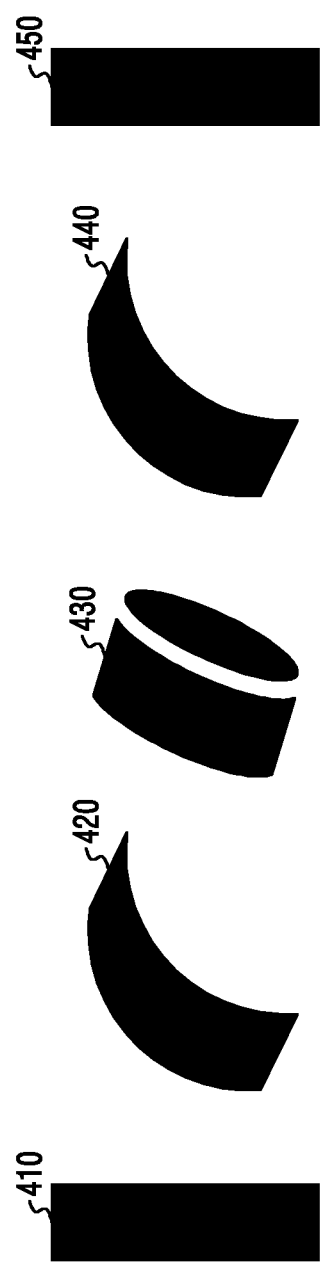
FIG. 4 illustrates operations according to a state of a flexible electronic device according to embodiments of the present disclosure.

FIG. 4 depicts operations according to a state of a flexible electronic device according to embodiments of the present disclosure.

Referring to FIG. 4, the flexible electronic device can have a wear state, a non-wear state, and first and second switchover states. The electronic device can switch from the non-wear state 410 to the wear state 430 through the first switchover state 420 as shown in FIG. 4. The electronic device can also switch from the wear state 430 to the non-wear state 450 via the second switchover state 440. The flexible electronic device can perform a preset function in the wear state and the non-wear state. The electronic device according to embodiments of the present disclosure can activate a corresponding device and/or UI so as to perform a suitable function (or operation) after the first and/or second switchover state 420 and/or 440.

For example, when the electronic device of the non-wear state is worn in a lock mode, the electronic device can activate the display 160 in the first switchover state 420 and display an unlock window for inputting unlock information. In the wear state 430, the electronic device can release the lock state according to the unlock information input to the unlock window on the display 160 and control a preset function. When switching from the wear state 430 to the non-wear state 450, the electronic device can recognize the non-wearing and display a home screen.

When the user dons the electronic device of the non-wear state which is processing biometric information, the electronic device can activate a corresponding medical sensor in the first switchover state 420. When the electronic device contacts the body part, the electronic device can measure bio information in a stabled state through the activated medical sensor. When switching from the wear state 430 to the non-wear state 450, the electronic device can supper the medical sensor.

Figure 5A:
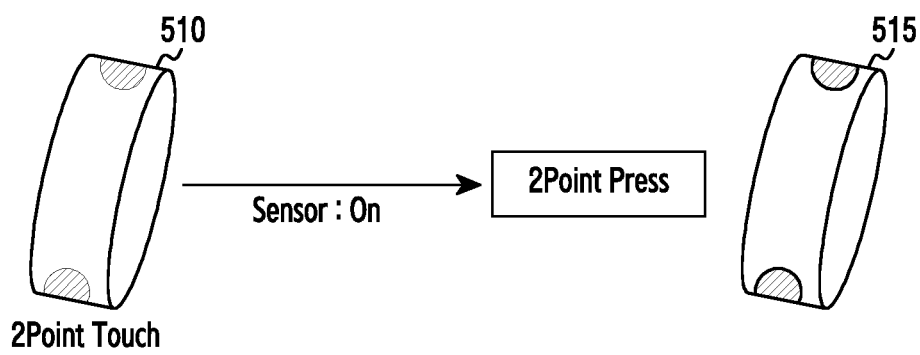
FIGS. 5A and 5B illustrate a touch interaction metaphor in an electronic device according to embodiments of the present disclosure.
Figure 5B:
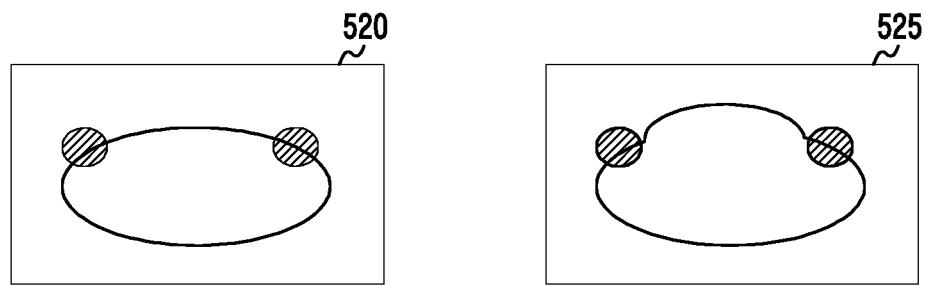

FIGS. 5A and 5B depict touch interaction metaphor in an electronic device according to embodiments of the present disclosure.

Referring to FIGS. 5A and 5B, when the electronic device is worn on the wrist, the electronic device can be bent in a circular shape 510, wherein a user's visible area on the screen and a range for the touch input can both decrease. Hence, the electronic device according to embodiments of the present disclosure can execute its function or control an object by combining the number of touch inputs, the number of presses detected based on the touch inputs, and a user interaction in the wear state. The user interaction can include a gesture and/or a motion. The gesture can include swipe, tap, or rotation, for example. That is, the gesture can be the user's touch or hovering input. The motion can include waving hand, turning wrist, and shaking wrist with the electronic device being worn.

In embodiments of the present disclosure, a multi-touch input is a 2-point touch by way of example. However, the touch interaction according to embodiments of the present disclosure can be applied to three or more touch points. When detecting a multi-touch 510 (hereafter, 2-touch or 2-point touch), the electronic device can activate (or turn on) a sensor, such as a press sensor, and detect whether a 2-point touch 515 is pressed. That is, upon recognizing the 2-point touch, the electronic device can analyze levels of the 2-point touch by activating the press sensor and recognize the touch point of the press level exceeding a preset level, as the press input among the two touch points.

When detecting press 520 on the 2-point touch as shown in FIG. 5B, the electronic device can change its shape 525 by curving outwards in the center by the 2-point press. When the electronic device 525 is deformed, a corresponding operation mode can be set in the electronic device. For example, the user and the electronic device can get closer to each other, such that when the microphone is installed on the front side of the electronic device and the input 525 is recognized, the electronic device can automatically execute a voice input mode.

Figure 6:
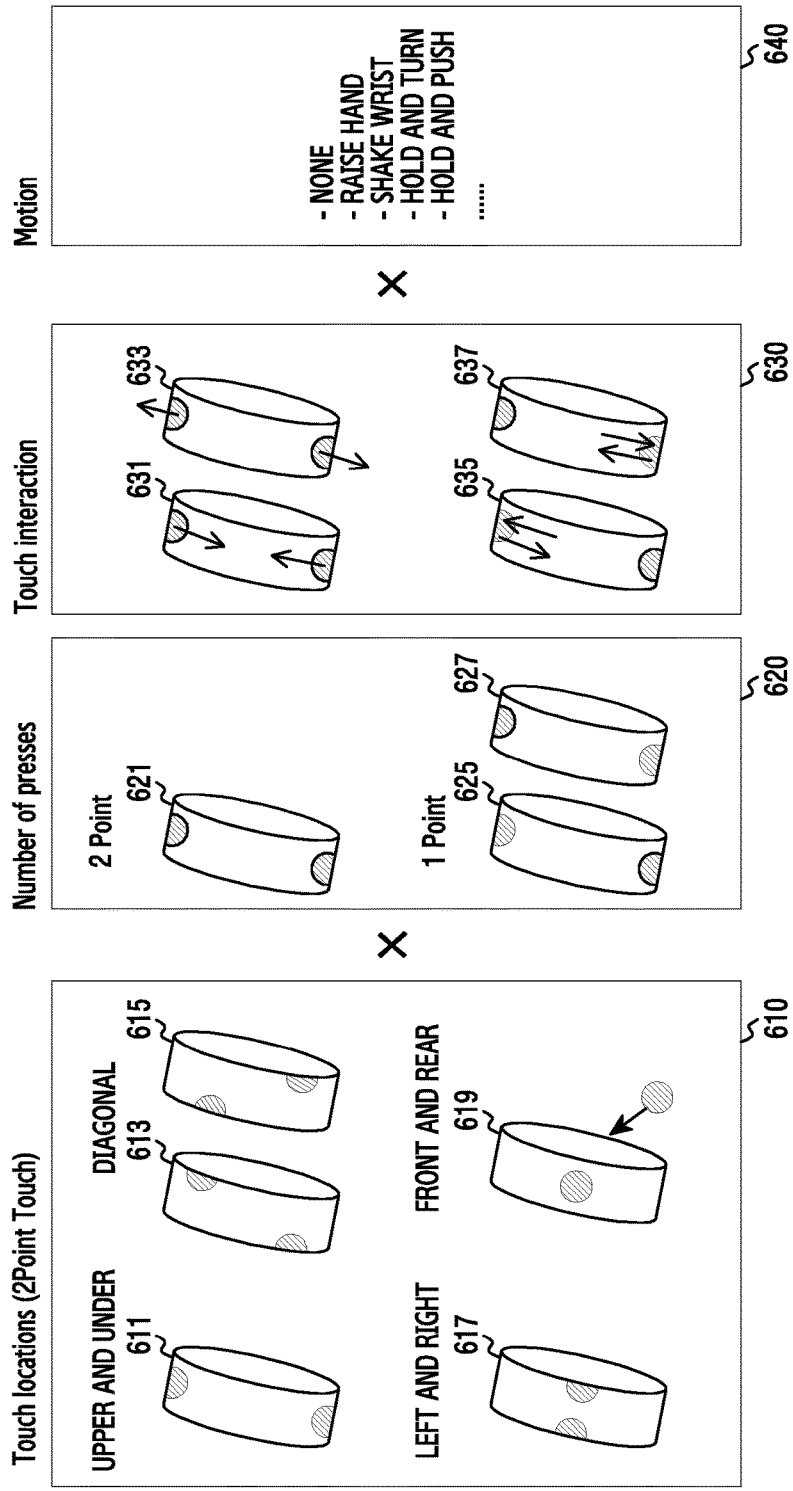
FIG. 6 illustrates interactions detected by an electronic device according to embodiments of the present disclosure.

FIG. 6 depicts interactions recognized by an electronic device according to embodiments of the present disclosure.

Referring to FIG. 6, touch points 610 are shown in the wear state and can be on upper and lower sides 611, diagonal sides 613 and 615, left and right sides 617, and front and rear sides 619.

The touch inputs have press numbers 620. For the touch input 611, the user can press a 2-point touch 621 and press lower or upper touch points 625 or 627. That is, the user can exert two presses or one press on the 2-point touch, and the electronic device can recognize the presses 621 through 627 according to the user press.

After applying the touch input and the press, the user can conduct a user interaction such as the swipe or the tap. After the 2-point touch and the press 621, the user can perform an inward swipe interaction 631 or an outward swipe interaction 633. After pressing at least one touch point 625 and 627, the user can input an inward or outward swipe interaction 635 or 637 at the touch point that is not pressed. After pressing at least one touch point 625 and 627, the user can tap the touch point that is not pressed.

After the touch 610, the press 620, and/or the touch interaction 630, the user can input an interaction in addition to a motion. Herein, the motion can be omitted and can include raising, waving, or turning a hand.

As shown in FIG. 6, the electronic device according to embodiments of the present disclosure can recognize various inputs according to the number of the touch points, the number of the presses, the gesture, and/or the motion, and execute the preset function or control the objects according to the inputs. In so doing, when the touch points 610 are detected and the press is detected in both points of the 2-point touch, the input for controlling a particular function or object can be set without a user's interaction. For example, when recognizing the touch point and the press 621, the electronic device can activate the microphone and enter an audio input mode. When detecting the touch input and the press 619, the electronic device can activate the medical sensor and enter a biometric mode.

Figure 7:
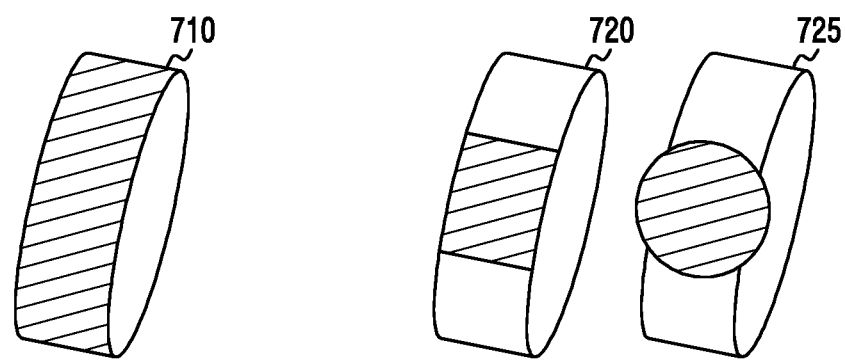
FIG. 7 illustrates various displays of an electronic device according to embodiments of the present disclosure.

FIG. 7 depicts various displays of an electronic device according to embodiments of the present disclosure.

Referring to FIG. 7, an electronic device 710 includes the display 160 covering its front side, and an electronic device 720 and 725 includes the display 160 of a watch type on the front side. When the display 160 is part of the electronic device, the display 160 can be configured in various shapes such as a rectangle 720 or a circle 725. An interaction set available according to the shape of the electronic device can vary. Hereafter, the electronic device includes the display 710 by way of example.

An electronic device according to embodiments of the present disclosure can include a flexible display, an input interface comprising a touch panel which detects a touch input, a press sensor for detecting a press of a touch input, and a processor functionally coupled with the display, the input interface, and the press sensor. The processor can recognize, when the electronic device is worn, a multi-touch, a press, and/or a touch interaction including an additional interaction and controls a function and/or an object of the electronic device.

When detecting a multi-touch input, the processor can activate the press sensor, and when detecting at least one press from multi-touch inputs, the processor can detect whether an additional interaction occurs and thus recognizes the touch interaction. The touch panel can include a first electrode and a second electrode, the press sensor can be disposed between the first electrode and the second electrode, and the processor can recognize a touch input, a location, and a press by applying a scan signal to the first electrode and receiving a sensing signal from the second electrode.

The multi-touch input can be a 2-point touch input, and, when a 2-point touch input is recognized, the processor can recognize a touch location.

When the touch location is on upper and lower sides of the electronic device and a press is recognized at the 2-point touch locations, the processor can activate a microphone and executes a voice input mode, and when recognizing a user in the voice input mode, the electronic device can execute the voice input mode of a whisper mode.

When the touch location is on front and rear sides of the electronic device and a press is recognized at a location comprising a medical sensor, the processor can activate the medical sensor and execute a biometric mode.

When the touch location is on upper and lower sides of the electronic device, a press is recognized at one of the touch locations, and a tap interaction is detected at the other touch location, the processor can control a volume according to the number of detected taps.

When the touch location is on upper and lower sides of the electronic device, a press is recognized at one of the touch locations, and a swipe interaction is detected at the other touch location, the processor can switch to a preset application according to a swipe direction. When the swipe interaction moves inward, the processor can display a quick panel screen on the display. When the swipe interaction moves inward, the processor can display a list of recent applications on the display.

When the touch location is on upper and lower sides of the electronic device, a press is recognized at the two touch locations, and a swipe interaction is detected, the processor can performs a preset function according to a swipe direction. The processor can display a previous depth screen for an inward swipe direction and display a next depth screen for an outward swipe direction.

When touch locations are diagonal, a press is recognized at the two touch locations, and a rotation interaction is detected, the processor can move a selected object in a rotation direction.

Herein, the touch interaction encompasses the touch input, the press, and the gesture.

Figure 8:
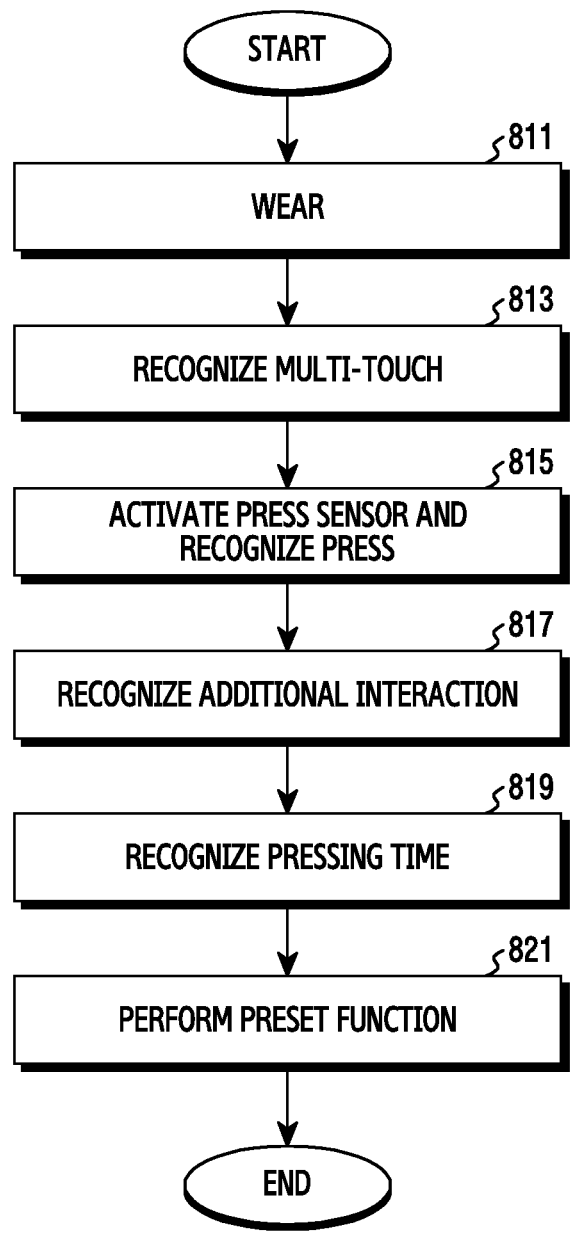
FIG. 8 illustrates a method for controlling operations according to a touch interaction in an electronic device according to embodiments of the present disclosure.

FIG. 8 illustrates a method for controlling operations according to a touch interaction in an electronic device according to embodiments of the present disclosure.

Referring to FIG. 8, the electronic device of the non-wear state can perform a normal operation. When the electronic device of the non-wear state is bent, the electronic device can detect the bending based on the output of the input interface 150 and/or the sensor 130. The electronic device can activate the function and/or the UI for performing the operation of the non-wear state after the electronic device is donned for wearing. Upon recognizing the wearing, the electronic device can switch to an operation mode of the wear state and execute the operation.

The bending of the electronic device can be recognized in various manners. When the electronic device switches from the non-wear state to the wear state, the user can wear the electronic device by bending it. For example, the user can bend the electronic device by touching upper and lower points of the electronic device and pressing the electronic device. The user can place the bent electronic device on his/her wrist and couple the electronic device. Hence, when the user bends the electronic device, the electronic device can recognize a user's multi-point touch, such as touching the upper and lower points of the display and/or the coupling unit, and recognize the press based on the user's bending.

The electronic device may recognize the body part on the user's wrist and can detect the user's multi-point touch through the input interface 150. The electronic device can detect the exerted press using the press sensor integrally formed with the touch panel of the input interface 150 or the press sensor separated from the sensor 130. The electronic device can recognize the bending through the independent bending sensor, such as a sensor disposed in the bezel area of the electronic device and detecting the bending. The electronic device can recognize its placement on the wrist through the medical sensor, such as an HRM sensor, independent from the sensor 130.

When recognizing the bending, the electronic device can save its power by sequentially activating the sensors. That is, upon detecting the user's bending intention, the electronic device can activate the sensor for detecting the bending. When detecting the multi-touch through the touch panel of the input interface 150, the processor 100 activates the sensor for detecting the bending. When the bending sensor outputs a detected bending signal, the processor 100 can recognizing the bending of the electronic device. In so doing, the bending sensor can be the press sensor. When detecting the multi-touch through the touch panel, the processor 100 can activate the press sensor, analyze the press level at the multi-touch point detected by the press sensor, and recognize the bending of the electronic device when the press level exceeds a preset level. The sensor 130 can include the medical sensor (e.g., HRM sensor), such that when detecting the multi-touch through the touch panel, the processor 100 activates the medical sensor. When the medical sensor outputs a body part contact signal, the processor 100 can recognizing the bending of the electronic device. The bending sensor can include the press sensor and the medical sensor. Upon detecting the multi-touch point through the touch panel, the processor 100 can activate the press sensor, activate the medical sensor when the press exceeds a preset level in the press sensor, and recognize the bending of the electronic device when the medical sensor detects the body part contact.

In FIG. 8, when switching from the non-wear state to the wear state, the electronic device can recognize the wearing in operation 811. The electronic device in the wear state can execute a function of an application or control an object according to various touch interactions of FIG. 6. When the multi-touch occurs, the electronic device can recognize the multi-touch input and the touch location in operation 813 and analyze the press level of the multi-touch by activating the press sensor in operation 815. The electronic device can recognize the number of the inputs having the press over a preset level among the multiple touch inputs in operation 815. After the detecting the press of the multi-touch, the electronic device can determine whether an additional interaction occurs. Herein, the additional interaction can be the gesture and the motion, and the gesture can include the swipe and the tap. Upon detecting the additional interaction, the electronic device can recognize the additional interaction detected through the input interface 150 in operation 817. In operation 819, the electronic device can recognize a pressing time.

When the electronic device is worn and the multi-touch is input, the electronic device can recognize the multi-touch locations and the touch press level. The electronic device can recognize the interactions generated by the user after the multi-touch is input, and recognize the pressing time when the press is detected. In operation 821, the electronic device can analyze the locations and the presses of the multi-touch, the additional interaction, and/or the pressing times, and execute the preset function or control the object according to the analysis result. When the multi-touch is input, and the multi-press is recognized and is maintained over a preset time without an additional interaction detected, the electronic device can automatically a preset function corresponding to the input. When the multi-touch is input, the press is detected at one or more touch points, and the additional interaction is recognized, the electronic device can execute the preset function or control the object according to the interaction.

FIG. 8 illustrates the operations for the multi-touch. However, the touch including three or more points in the wear state of the electronic device may not be suitable for form purposes. Herein, it is assumed that 2-point touch including the touch location, the press of one point or two points, the additional interaction, such as a user's free gesture and/or motion while still touching and/or pressing, and/or the pressing time are analyzed.

Figure 9:
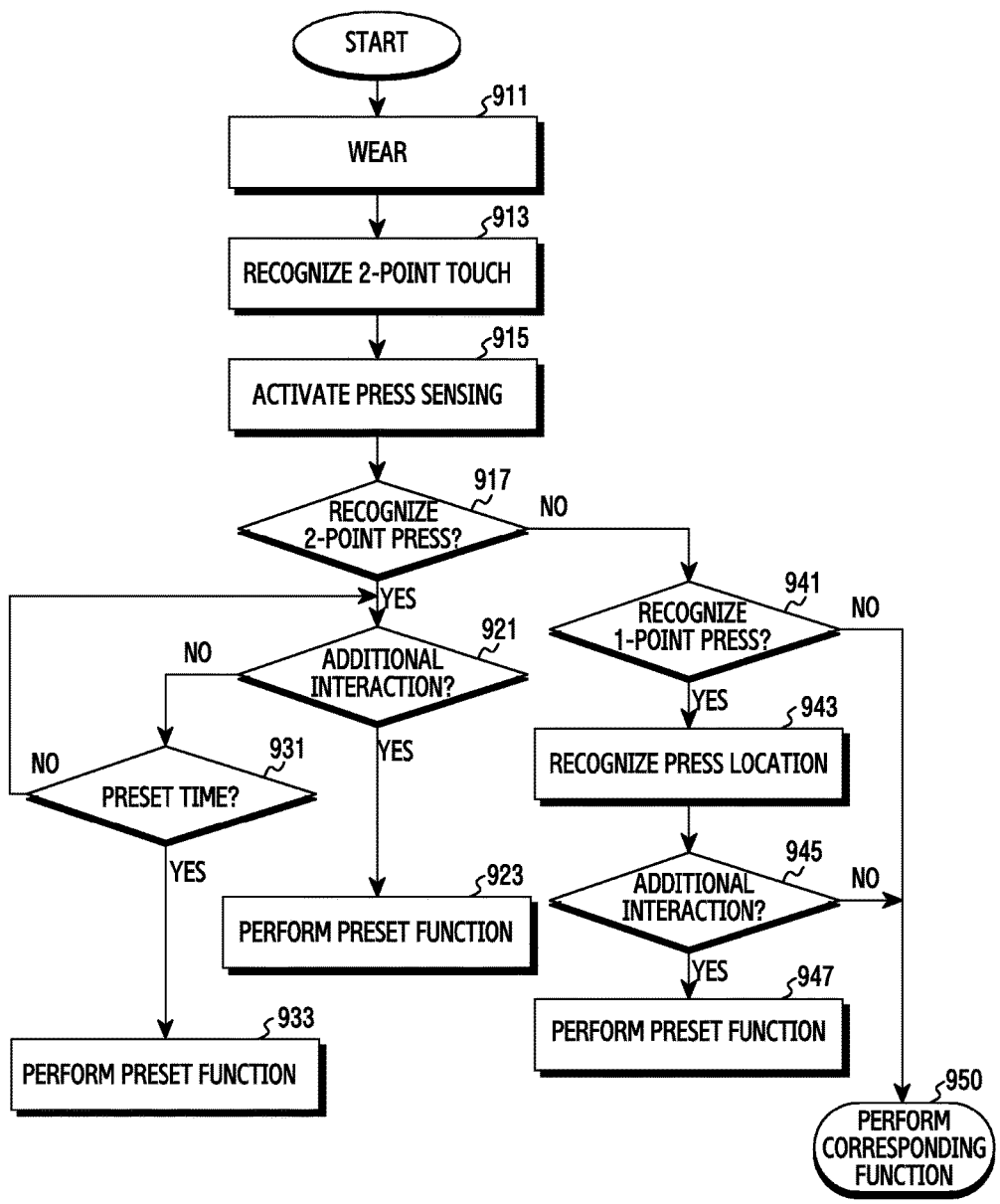
FIG. 9 illustrates a method for controlling operations according to a 2-point touch interaction in an electronic device according to embodiments of the present disclosure.

FIG. 9 illustrates a method for controlling operations according to a 2-point touch interaction in an electronic device according to embodiments of the present disclosure.

Referring to FIG. 9, the electronic device is worn in operation 911 and executes a preset application of the wear state. When the user inputs a 2-point multi-touch to the electronic device, the electronic device can recognize the multi-touch input in operation 913. In so doing, the 2-point touch can be one of the inputs 610 of FIG. 6. When detecting the 2-touch input, the electronic device can also recognize their touch locations in operation 913. In operation 915, the electronic device can activate the press sensor, such as when satisfying a condition of measuring the press level (such as detecting the 2-touch input), and thus reduce the power consumption for driving the press sensor. However, the electronic device may recognize the touch input and the press simultaneously.

In operation 917, the electronic device can analyze the output of the press sensor and thus obtain the press level of the 2-point touch inputs. When the press of the 2-point touch exceeds a preset level, the electronic device can determine whether the 2-point touch is recognized in operation 917 and, if the 2-point touch is recognized, determine whether an additional interaction occurs in operation 921. Herein, the additional interaction can include the gesture and the motion, and the gesture can include the tap and the swipe. Hereafter, the additional interaction is the gesture by way of example. Upon detecting the additional interaction in operation 921, the electronic device can recognize the additional interaction and perform a preset function and/or object corresponding to the 2-point touch, the two presses, and the interaction in operation 923. When not detecting the additional interaction in operation 921, the electronic device can determine whether the 2-point touch is pressed over a preset time in operation 931. When the 2-point touch is pressed over the preset time, the electronic device can recognize the pressing time and control the preset function and/or object corresponding to the 2-point touch and the 2-point press in operation 933. When the 2-point touch is not pressed over the preset time, the method returns to operation 921 to determine whether there is an additional interaction, When a 2-point press is not recognized in operation 917, such as when detecting one press in the 2-point press, the electronic device can determine whether the 1-point press recognized in operation 941 and, if the 1-point press is recognized, recognize the press location in the 2-point press in operation 943. When an additional interaction, such as a tap or swipe interaction at the touch point of the undetected press occurs, the electronic device can recognize the additional interaction in operation 945 and control a preset function and/or object in operation 947.

When the 1-point press is not recognized in operation 941 or the additional interaction is not recognized in operation 945, the electronic device can perform a corresponding function in operation 950, which can be preset for the current input. Without the preset function, the input can be ignored or processed as an error.

Figure 10:
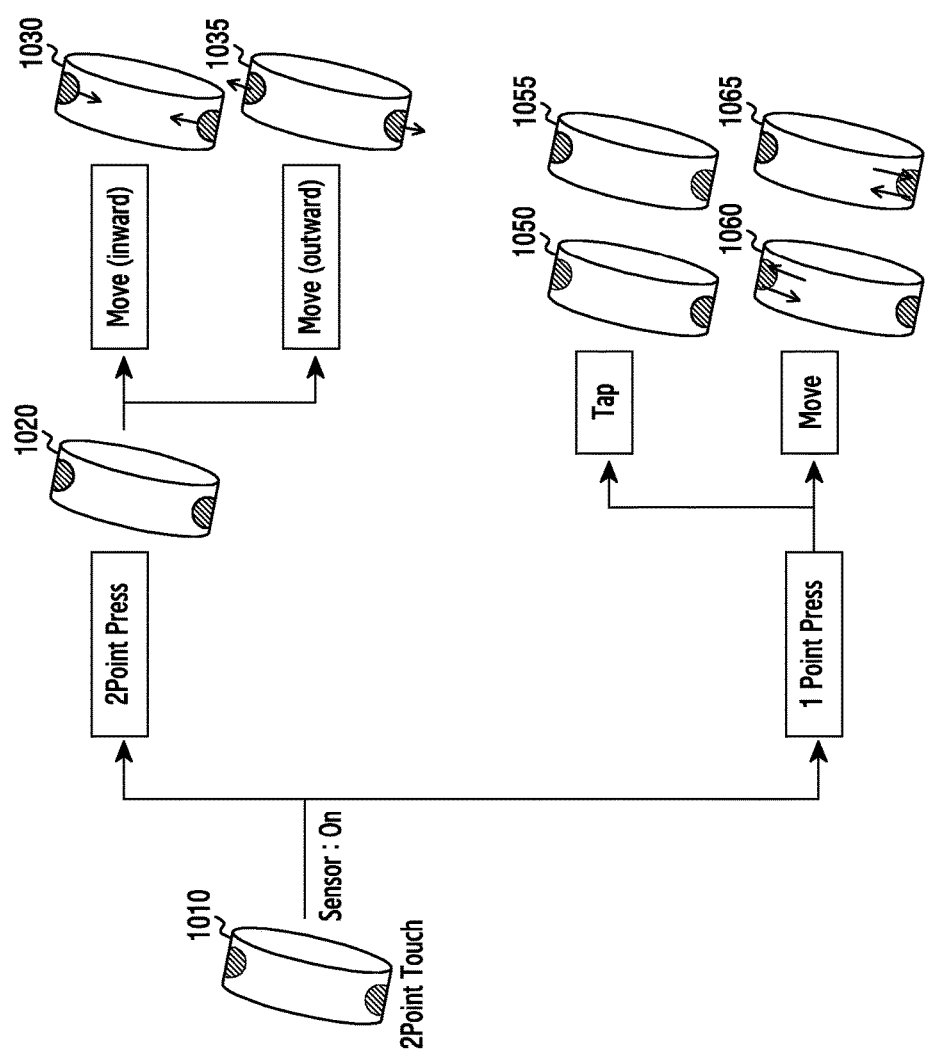
FIG. 10 illustrates operations according to a 2-point touch interaction with an electronic device put on according to embodiments of the present disclosure.

FIG. 10 depicts operations according to a 2-point touch interaction with an electronic device put on according to embodiments of the present disclosure.

Referring to FIGS. 9 and 10, when the electronic device is worn and a 2-point touch 1010 is input to the upper and lower sides, the electronic device can recognize the 2-point touch in operation 913 and activate the sensor for detecting the press of the 2-point touch in operation 915. In so doing, when detecting the press 1020 in the 2-point touch, the electronic device can recognize in operations 917 and 921 and perform the preset function of the corresponding touch interaction in operation 923. The touch interaction can move inward while pressing the 2-point touch 1030, or move outward while pressing the 2-point touch 1035.

When detecting the press in one point of the 2-point touch, the electronic device can recognize the press in operations 917 and 941 and locate the touch location of the detected press in operation 943. The electronic device can recognize the interaction at the touch location of the undetected press in operation 945 and then perform the preset function of the corresponding touch interaction in operation 947. In so doing, the additional interaction can be the tap or the swipe. The touch interaction can include a touch interaction 1050 which taps the upper point while presses of lower point maintains (such as long press), a touch interaction 1055 which taps the lower point while presses of upper point maintains (such as long press), a touch interaction 1060 which swipes inwards or outwards at the upper point while presses of lower point maintains (such as long press), and a touch interaction 1065 which swipes inwards or outwards at the lower point while presses of upper point maintains (such as long press).

In FIG. 9, when the multi-touch and the multi-press are detected and the preset multi-pressing time passes, the preset function is conducted without checking the additional interaction. However, another function can be set when the additional interaction occurs even after the preset pressing time.

Figure 11:
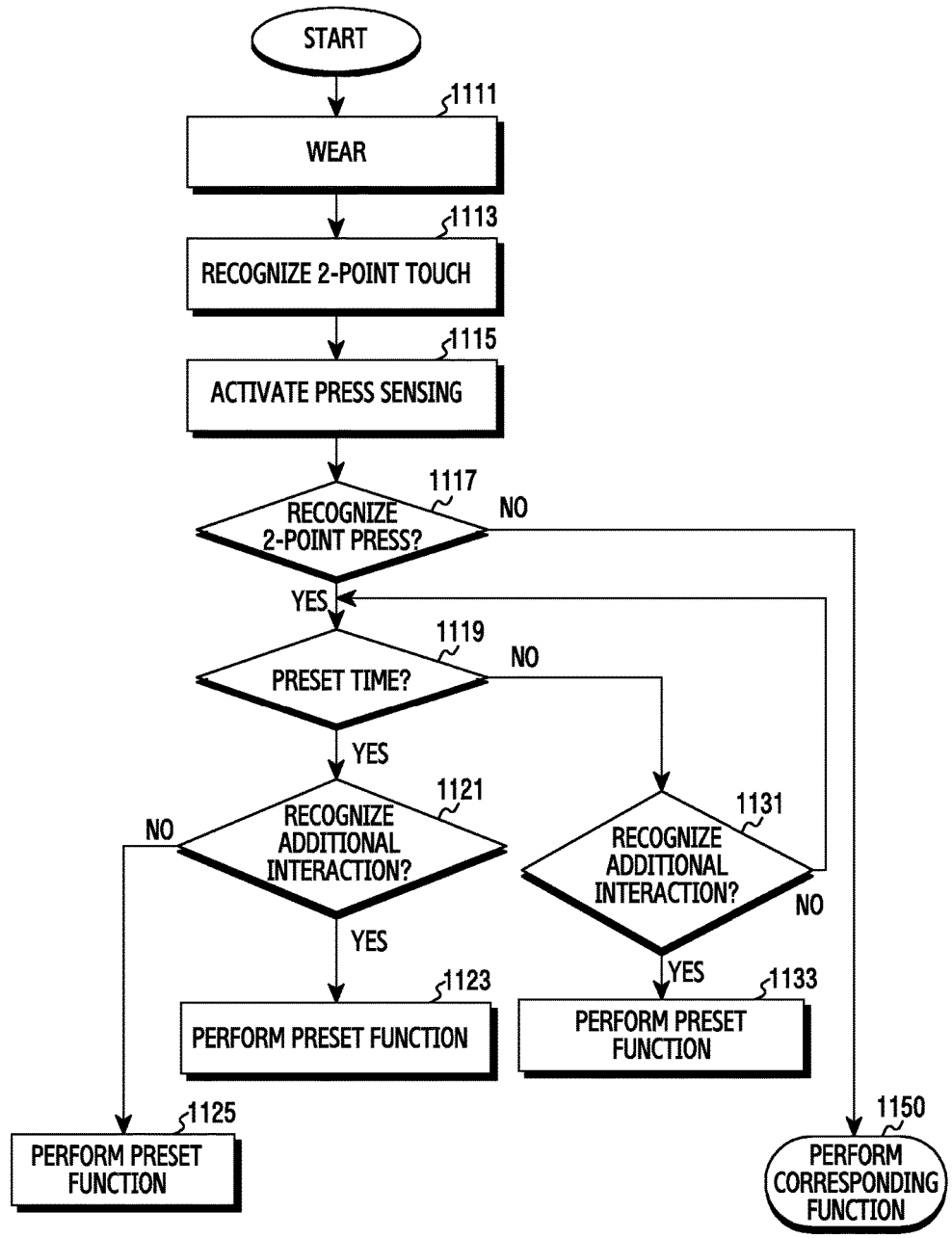
FIG. 11 illustrates another method according to a 2-point touch interaction with an electronic device put on according to embodiments of the present disclosure.

FIG. 11 illustrates another method according to a 2-point touch interaction with an electronic device put on according to embodiments of the present disclosure.

Referring to FIG. 11, operations 1111 through 1117 can be performed in the same manner as operations 911 through 917 of FIG. 9. When detecting a 2-point touch and not detecting a 2-point press, such as by recognizing a 1-point press in operation 1117 and perform a corresponding function and/or control an object according to the 2-point touch and a 1-point press in operation 1150, such as in the same manner as operations 941 through 950 of FIG. 9.

When recognizing the 2-point press in operation 1117, the electronic device can determine whether the press is maintained over a preset time in operation 1119. The electronic device can determine whether the additional interaction is recognized in operation 1131 within the preset time and perform a function corresponding to the touch interaction in operation 1133 if the additional interaction is recognized within the preset time. If the additional interaction is not recognized in operation 1131, the method returns to operation 1119.

When the press is maintained over the preset time in operation 1119, the electronic device can recognize the pressing time and determine whether an additional interaction occurs in operation 1121. When detecting the additional interaction while the press is maintained over the preset time, the electronic device can perform a preset function in operation 1123. When not detecting the additional interaction, the electronic device can perform a preset function in operation 1125. That is, when detecting the additional interaction with the press maintained over the preset time, the electronic device can perform the preset function in FIG. 10. The function conducted in operation 1123 can be the same as or different from the function conducted in operation 1133.

For example, the preset pressing time is recognized in operation 1119, the additional interaction is recognized in operation 1121, and the electronic device can control the preset function and/or object in operation 1125. When detecting an additional interaction while controlling the corresponding function and/or object, the electronic device can control the function and/or the object which are/is set by the detected additional interaction in operation 1123.

In FIG. 9 and FIG. 11, when detecting the 2-point touch, the electronic device checks the press of the 2-point touch and controls the preset function. For example, when detecting the upper and lower touch of the worn electronic device as shown in FIG. 10, the electronic device can analyze the press and the additional interaction and perform the preset functions. However, the 2-point touch can occur at various points. For example, besides the upper and lower sides, the 2-point touch 610 can be input to the diagonal sides, the left and right sides, and the front and rear sides as shown in FIG. 6. Hence, for the 2-point touch 610 of FIG. 6, the electronic device can be configured to control the function and/or the object.

Figure 12:
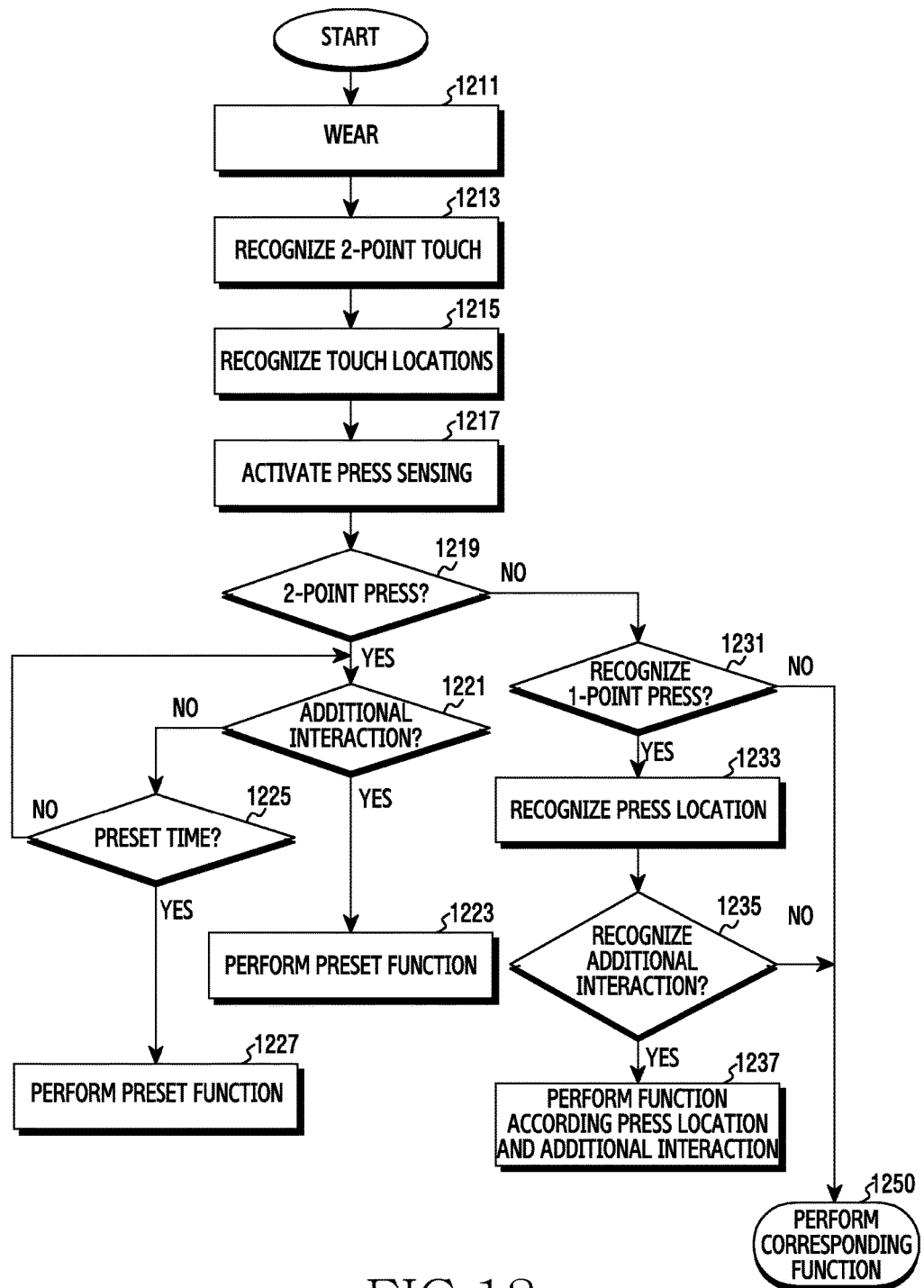
FIG. 12 illustrates a method according to a 2-point touch interaction with an electronic device put on according to embodiments of the present disclosure.

FIG. 12 illustrates a method according to a 2-point touch interaction with an electronic device put on according to embodiments of the present disclosure.

Referring to FIG. 12, the electronic device can recognize the wear state in operation 1211. When a 2-point touch is input in the wear state, the electronic device can recognize the 2-point touch in operation 1213 and locations of the 2-point touch in operation 1215. That is, the 2-point touch can be one of the inputs 610 of FIG. 6, and the electronic device can also recognize the touch locations together with the 2-point touch. In operation 1217, the electronic device can activate the press sensor.

In operation 1219, the electronic device can analyze the output of the press sensor and obtain the press level of the 2-point touch. When the press level of the 2-point press exceeds a preset level, the electronic device can determine whether an additional interaction occurs in operation 1221. Upon detecting the additional interaction, the electronic device can recognize the additional interaction in operation 1221 and control a preset function and/or object corresponding to the 2-point touch locations, the 2-point press, and the additional interaction in operation 1223. By contrast, when not detecting the additional interaction in operation 1221, the electronic device can determine whether the 2-point touch is pressed over a preset time in operation 1225. When the 2-point touch is pressed over the preset time, the electronic device can recognize the pressing time in operation 1225 and control a preset function and/or object corresponding to the 2-point touch locations and the 2-point press in operation 1227. When the 2-point touch is not pressed over the preset time in operation 1225, the method returns to operation 1221.

When a 2-point press is not recognized in operation 1219, such as when detecting one press from the 2-point touch, the electronic device can recognize the 1-point press in operation 1231 and locate the press location of the 2-point touch in operation 1233. When an additional interaction occurs, such as a tap or swipe interaction at the touch location of the undetected press, the electronic device can recognize the additional interaction in operation 1235 and control a preset function and/or object in operation 1237.

When the 1-point press is not detected in operation 1231 or the additional interaction is not recognized in operation 1235, the electronic device can perform a corresponding function in operation 1250. Herein, the corresponding function can be a preset function for the current input. Without the preset function, the input can be ignored or processed as an error.

For example, when the touch 619 of FIG. 6 is input and long-pressed over a pre-determined time, the electronic device can recognize the touch input on the front and rear sides in operation 1215 and the long press over the preset time in operation 1215, and execute a preset function, such as a biometric function. For example, when the touch 613 is input and a rotation interaction is detected in operation 1221, the electronic device can execute the preset function, such as time control in a watch application, in operation 1223.

As such, the electronic device in the wear state on according to embodiments of the present disclosure can control the function and/or the object according to various touch interactions. Herein, the function and/or the object can conduct microphone activation, bio measurement, volume/brightness control according to a running application, application execution, content control, and time control, for example.

Figure 13:
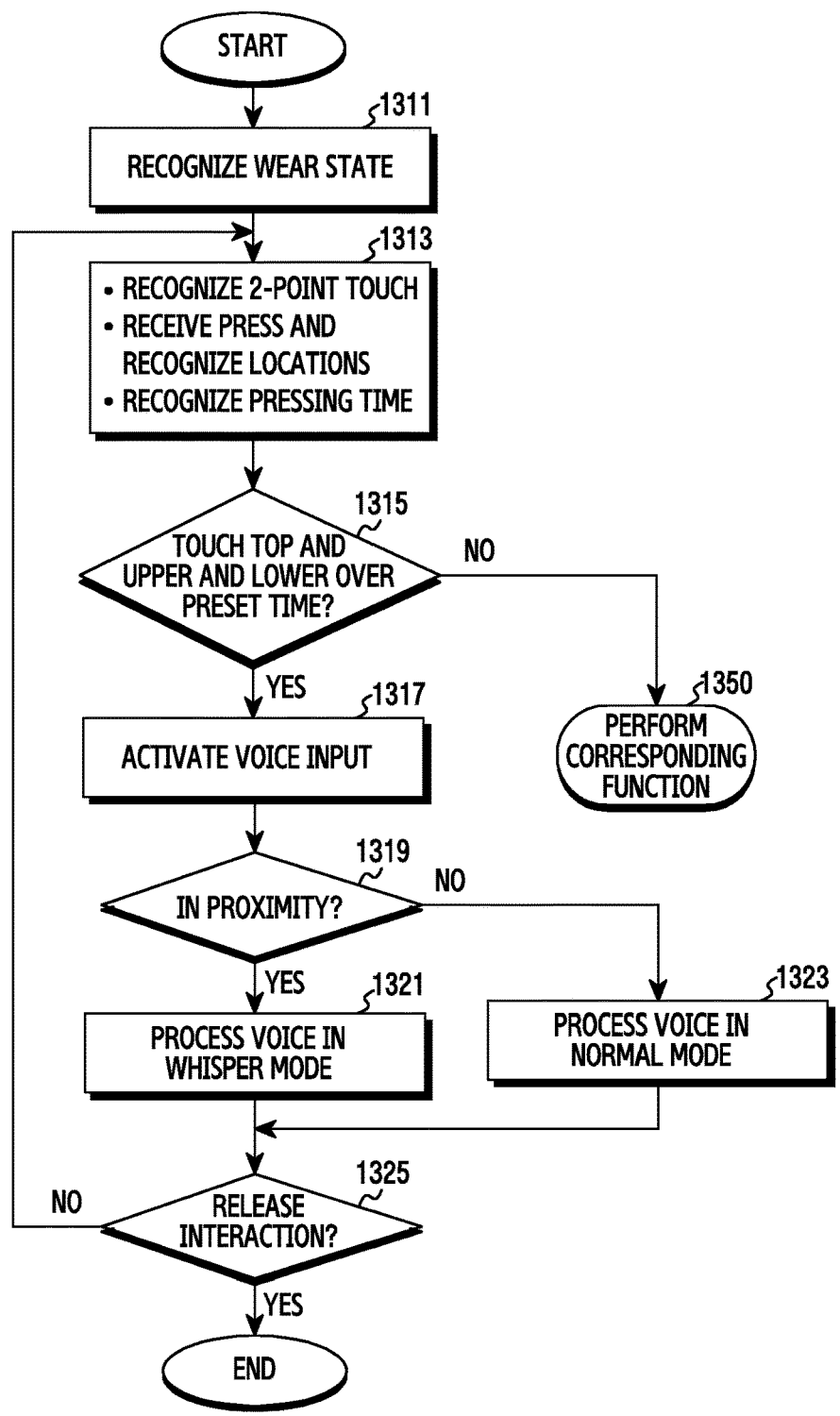
FIG. 13 illustrates a method for entering a voice input mode with an electronic device put on according to embodiments of the present disclosure.
Figure 14:
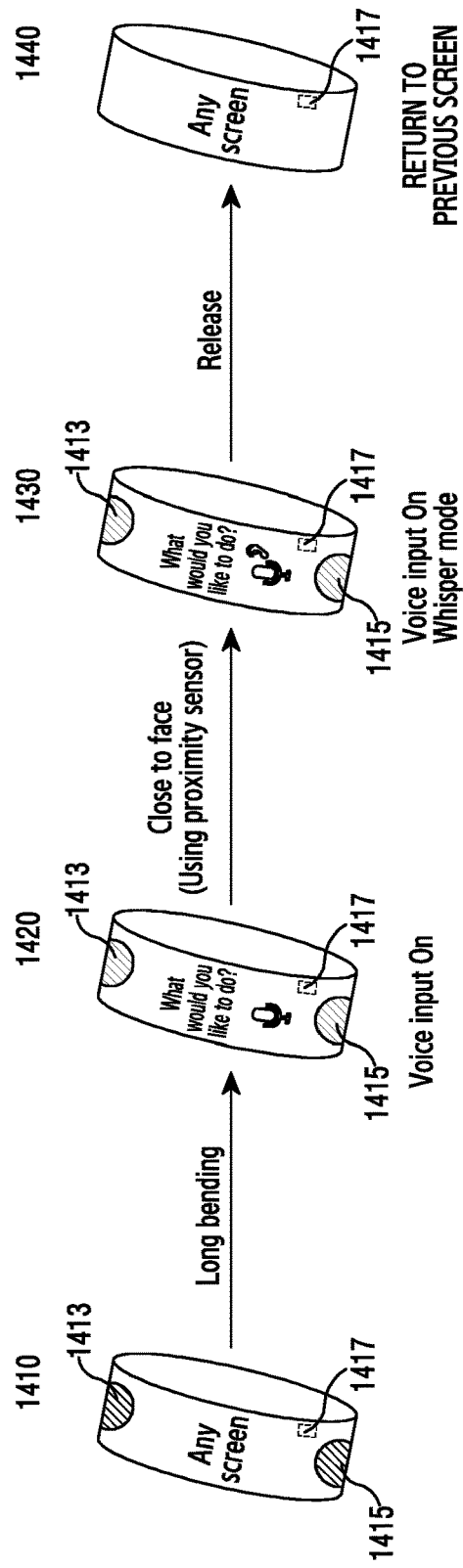
FIG. 14 illustrates operations in a voice input mode of FIG. 13.

FIG. 13 illustrates a method for entering a voice input mode with an electronic device being worn according to embodiments of the present disclosure. FIG. 14 depicts operations in the voice input mode of FIG. 13.

Referring first to FIG. 13, the electronic device can detect the wear state in operation 1311. In so doing, when a 2-point touch is input, the electronic device can detect locations of the 2-point touch, number and locations of presses, and pressing times in operation 1313. When the touch is input on the upper and lower sides and pressed over a preset time, the electronic device can recognize the touches in operation 1315 and turn on the microphone in operation 1317. The electronic device can analyze a distance between the user and the electronic device. When the electronic device is close to the user based on the analyzed distance in operation 1319, the electronic device can set the voice input mode to a whisper mode in operation 1321. When the electronic device is not close to the user based on the analyzed distance in operation 1319, the electronic device can set a normal voice mode in operation 1323. The proximity of the user and the electronic device can be determined using a proximity sensor or the camera unit 140. When a speaker phone mode is activated, the whisper mode can be processes in a lower volume than the normal voice mode. When a release interaction occurs, such as the 2-point touch release, the electronic device can recognize the release interaction and turn off the microphone in operation 1325. When the release interaction does not occur, the method returns to operation 1313.

When it is determined in operation 1315 that the touch is input on the upper and lower sides and is not pressed over the preset time, the electronic device can proceed to operation 1350 to perform a corresponding function.

Referring to FIGS. 13 and 14, when the user touches an upper point 1413 and a lower point 1415 of the electronic device 1410 and then exerts the press over a certain level and preset time, the electronic device can recognize the same in operation 1315 and turn on the microphone in operation 1317. A microphone 1417 can be a speaker phone including an all-in-one microphone/speaker. The electronic device 1420 can activate the voice input mode (voice input on) in operation 1317 and display the voice input mode activation on the display 160. The electronic device 1420 detects a distance between the user and the electronic device using a sensor. When the distance of the user and the electronic device is within a preset distance or when the user is recognized, the electronic device 1430 can set the whisper mode and display the whisper mode on the display 160. When the 2-point touch is released, the electronic device 1440 can recognize the release and release the voice input mode in operation 1325.

As shown in FIGS. 13 and 14, when the user long-presses and bends the upper and lower sides of the electronic device, the electronic device 525 can be curved upwards as shown in FIG. 5B. That is, in the voice input mode, the user can place the electronic device close to his/her lips. Hence, as the microphone is disposed on the front side of the electronic device, the electronic device is curved upwards, and the microphone approaches the user, the voice input mode can be set. For example, in a call mode of the electronic device being worn, when the user inputs the touch interaction 525 of FIG. 5B and an earphone/headphone is not connected, the electronic device can enter a speaker phone call mode. When the earphone/headphone is connected, the electronic device can enter the voice input mode by tuning on the microphone alone. In so doing, the electronic device checks the distance from the user and operates in a whisper mode when the electronic device is close to the user. Otherwise, the electronic device can operate in the normal voice mode.

Figure 15:
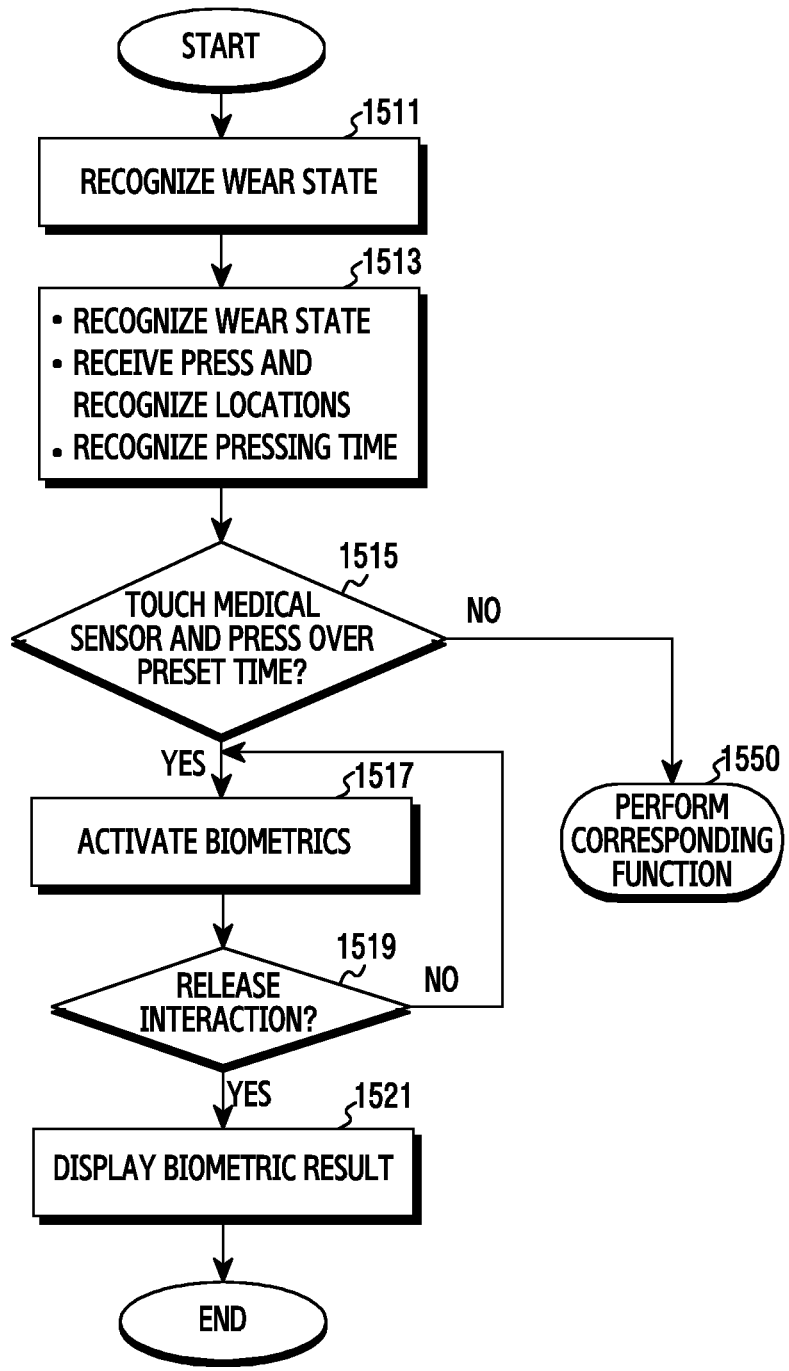
FIG. 15 illustrates a method for entering a biometric mode with an electronic device put on according to embodiments of the present disclosure.
Figure 16:
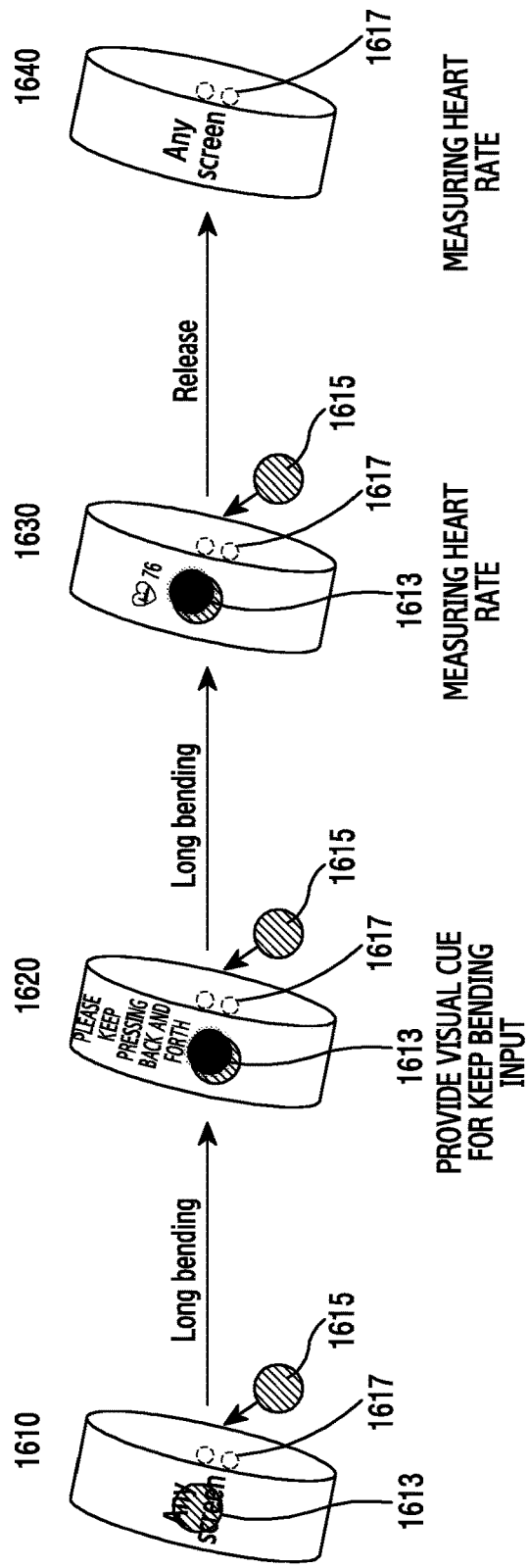
FIG. 16 illustrates operations in a biometric mode of FIG. 15.

FIG. 15 illustrates a method for entering a biometric mode with an electronic device put on according to embodiments of the present disclosure. FIG. 16 depicts operations in the biometric mode of FIG. 15.

In the biometric operation, the medical sensor can be disposed at the optimal position for biometrics. For example, it is advantageous that the medical sensor is disposed at the center of an inner side or an outer side of the wrist for measurement purposes. When the user dons the electronic device, the coupling unit can be positioned at the center of the inner side (inner part of the wrist) or the outer side (outer part of the wrist towards the back of the hand) of the wrist, which can be similar to a watch in form. In this case, the medical sensor can be mounted at either the center of the rear side of the display 160 or the coupling. The electronic device can mount a PCB, key buttons, and/or sensors in the coupling unit. Accordingly, the coupling unit can be larger in volume than other areas on the display 160. Hence, the user may wear the electronic device such that the coupling unit is positioned in other direction than the center of the wrist, such as toward a hand blade.

The medical sensor can be mounted on the rear side of the electronic device. When the user wears the electronic device, the medical sensor can be positioned at the center of the inner or outer side of the wrist.

The medical sensor can be an HRM sensor. As the heart iterates relaxation and contraction, a blood flow of a peripheral blood vessel and a volume of the blood vessel vary. The HRM sensor can measure a transmittance amount of light based on the variation of the blood vessel and thus represent the heart beat using a waveform. That is, the HRM sensor can employ a photoplethysmography (PPG) method to measure variations of the blood flow or oxygen saturation within the blood vessel.

The HRM sensor can include an optical unit including a light emitting element and a light receiving element. The user can tightly attach the HRM sensor to his/her body part and then conduct the PPG. The HRM sensor can measure biometrics, such as blood flow, heart rate, or oxygen saturation. In the biometric mode, a light irradiated from the light emitting element, such as an LED of the HRM sensor can pass several media of the body and diffuse and/or scatter while spreading out. The diffusing and/or scattering light can be detected through the light receiving element, such as a photo detector. The optical unit can also include an Infrared (IR) LED, and a red LED, a photo detector and a green LED, or include a photo detector, an IR LED, a red LED, and a green LED. Light emitting elements can measure the oxygen saturation using a plurality of LEDs.

The HRM sensor can measure the biometric variation, such as heart rate, using variation. For example, the blood increases in the blood vessel which darkens during contraction and the blood decreases in the blood vessel which brightens during relaxation. The light received at the light receiving element can decrease during contraction but increase during relaxation. The sensor can analyze the variation by finding a minimum brightness point and measure the frequency of variations over a particular threshold. The sensor can calculate the heart rate using pulses per hour or pulses per second, based on the measurement.

Referring to FIG. 15, the electronic device can recognize its wear state in operation 1511. In so doing, when a 2-point touch is input, the electronic device can detect locations of the 2-point touch, number and locations of presses, and pressing times in operation 1513. When the touch is input to the front and rear sides including the medical sensor and is pressed over a preset time, the electronic device can recognize the same in operation 1515 and activate the medical sensor in operation 1517. The electronic device can enter the biometric mode of the user through the medical sensor and display biometric information on the display 160. When recognizing a release interaction in operation 1519, such as touch release, the electronic device can finish the biometric operation and can display the biometric result on the display 160 in operation 1521. When the release interaction is not recognized in operation 1519, the method returns to operation 1517. When it is determined in operation 1515 that the touch is made on the medical sensor and is not pressed over the preset time, the electronic device can proceed to operation 1550 to perform a corresponding function.

Referring to FIGS. 15 and 16, the medical sensor 1617 can be disposed on the rear side of the electronic device 1610. The position of the medical sensor 1617 can be the same as or close to a rear point 1615. When the user touches a front point 1613 and the rear point 1615 of the electronic device 1610 and then presses these points over a certain press level and over a preset time, the electronic device can recognize the press of the 2-point touch including the medical sensor 1615 and activate the medical sensor 1617 in operation 1515. The medical sensor can be the HRM sensor and measure the blood pressure, the heart rate, and/or and oxygen saturation. When recognizing the press at the 2-point touch including the medical sensor 1617, the electronic device 1620 can initiate the biometric mode in operation 1517 and display biometric mode information on the display 160. In so doing, the electronic device can display visual cue information, such as a message stating "Keep pressing back and forth" on the display 160, for display information input, such as to measure the heart rate, enabling the HRM sensor to be closely attached to the user's blood vessel. In the biometric mode, the electronic device 1630 can display the medical measurement (measuring the heart rate by closely attaching the HRM sensor to the body part through a squeeze input) in operation 1517. When the 2-point touch is released, the electronic device can recognize the release, release the biometric mode, and display the measurement result in operation 1519. The electronic device 1640 can switch to any screen.

As shown in FIGS. 15 and 16, when the user touches the front and rear sides of the electronic device including the medical sensor 1617 and long-presses and bends the electronic device, the electronic device can recognize the squeeze of the medical sensor 1617, automatically activate the medical sensor, and then enter the biometric mode. For example, when the electronic device is worn, the biometric sensor disposed on the rear side of the electronic device can contact the inner part of the wrist or the back of the hand. At this time, when the user touch and presses two points including the medical sensor, the medical sensor closely contacts the wrist and the biometric mode is automatically executed.

Figure 17:
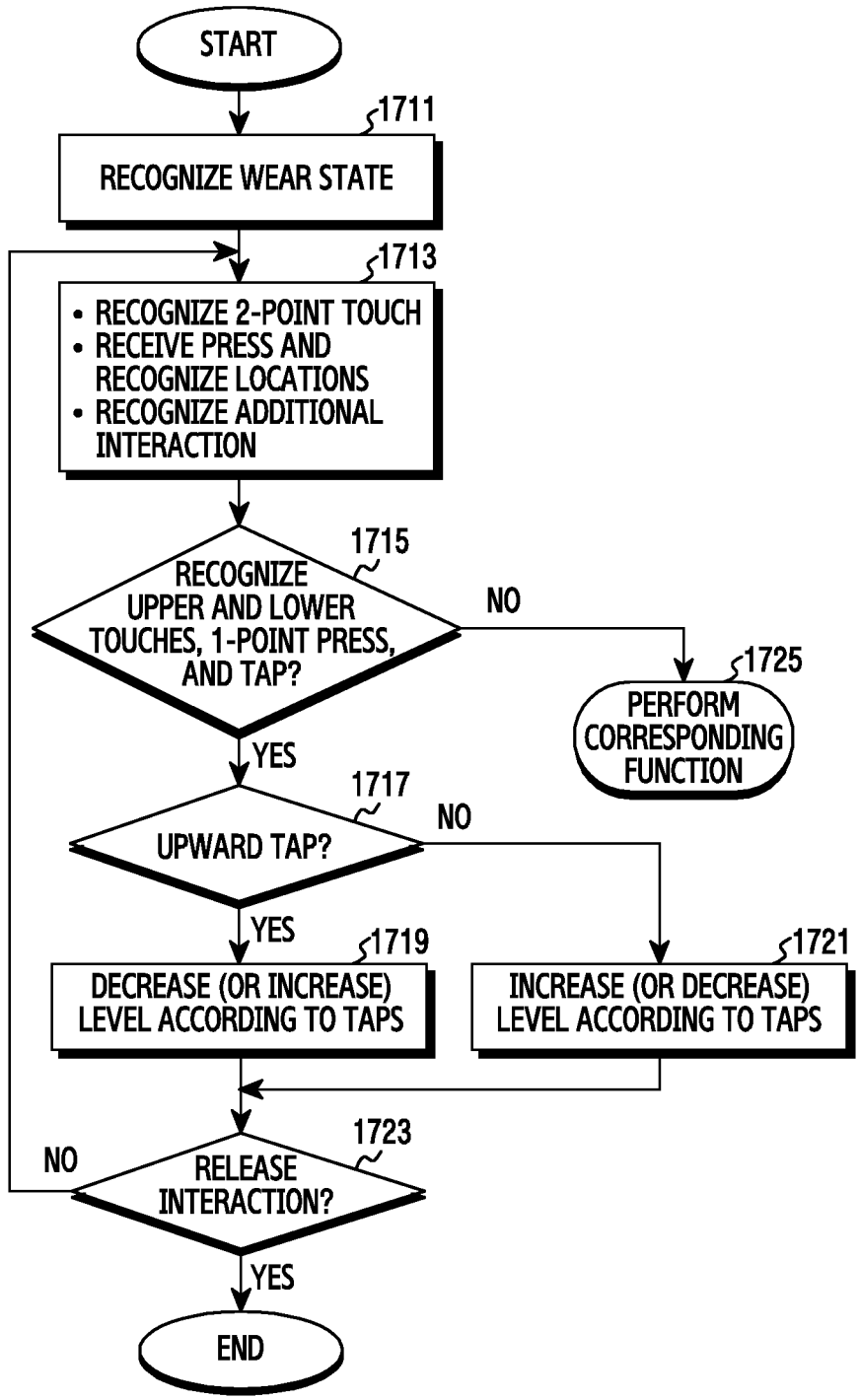
FIG. 17 illustrates a method for entering a level control mode with an electronic device put on according to embodiments of the present disclosure.
Figure 18:
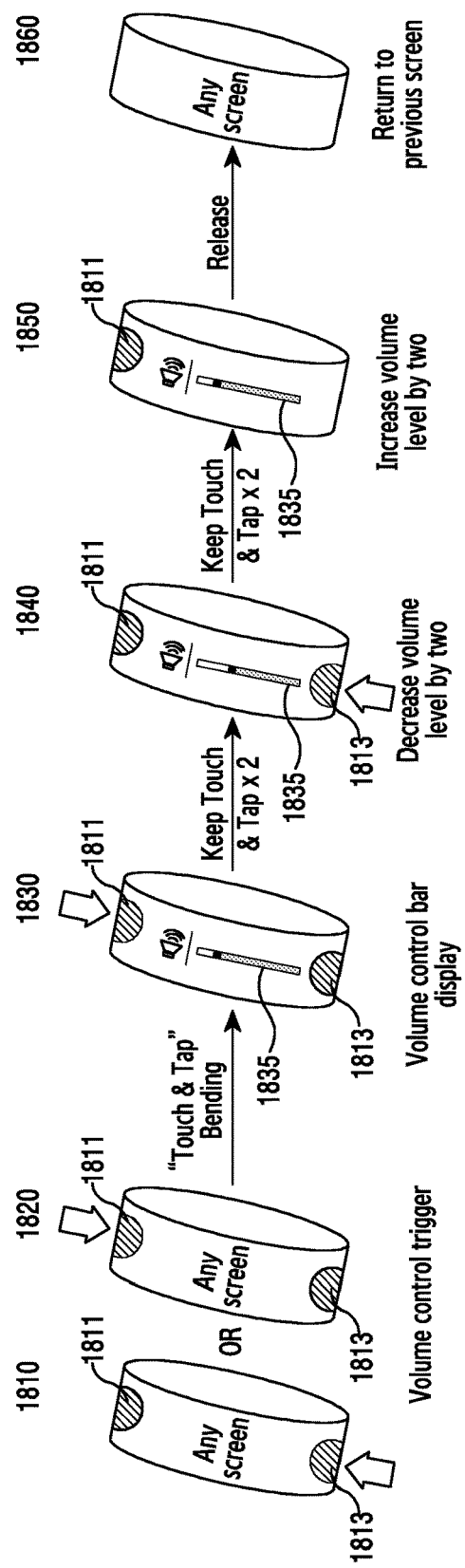
FIG. 18 illustrates operations in a level control mode of FIG. 17.

FIG. 17 illustrates a method for entering a level control mode with an electronic device worn according to embodiments of the present disclosure. FIG. 18 depicts operations in the volume control mode of FIG. 17. Herein, the level can include a volume level, a brightness level, or a count level. That is, level increase can indicate count up, and level decrease can indicate count down.

Referring to FIG. 17, the electronic device can recognize its wear state in operation 1711. In so doing, when a 2-point touch is input, the electronic device can detect locations of the 2-point touch, number and locations of presses, and additional interactions in operation 1713. When the touch is input to the upper and lower sides of the electronic device, the press is recognized at one point of the 2-point touch, and a tap interaction is detected at an untouched point, the electronic device performs this recognition in operation 1715, and upon recognizing the tap interaction, determines the tap interaction (or the pressed point) in operation 1717. When the tap is detected as an upward tap on the upper point or upper side, the electronic device decreases or increases the level according to the detected taps in operation 1719. When the tap is detected as a downward tap or on a lower point or lower side, the electronic device increases or decreases the level according to the detected taps. When a release interaction occurs, the electronic device can recognize the release interaction in operation 1723 and finish the level control. When any of the touch input to the upper and lower sides of the electronic device, the press recognized at one point of the 2-point touch, and the tap interaction detected at an untouched point are not recognized in operation 1715, the electronic device proceeds to operation 1725 to perform a corresponding function.

Referring to FIGS. 17 and 18, when the user touches an upper point 1811 and a lower point 1813 of the electronic device 1810, presses one of the two touch points, and then inputs a tap interaction at the other point, the electronic device can increase or decrease (or count up or down) the level according to the tap location. For example, the user can input the tap interaction at the lower point 1813 while pressing the upper point 1811 of the electronic device 1810, or input the tap interaction at the upper point 1811 while pressing the lower point 1813 of the electronic device 1820. The electronic device can recognize the interaction in operations 1713 and 1715, and increase or decrease a preset level, such as the volume level or the brightness level of a corresponding application in operations 1719 or 1721. For example, for the volume control, when the electronic device 1810 or 1820 displays any screen and the electronic device 1830 recognizes the press at the lower point 1813 and the tap interaction at the upper point 1811 or vice versa, the electronic device can display a volume control bar 1835 on the display 160 and display a current volume level. When two taps are input at the upper point 1811, the electronic device 1840 can lower the volume level by two levels and display the lowered volume level on the display 160. With the lowered volume level in the electronic device 1840, when the press or tap location is changed, the press is recognized at the upper point 1811, and the tap interaction is recognized at the lower point, the electronic device 1850 can increase the volume level according to the recognized taps and display the adjusted volume level on the display 160. When the touch is released, the electronic device 1860 can finish the volume control and return to the previous screen.

As shown in FIGS. 17 and 18, when recognizing the 2-point touch, recognizing the press at one point of the 2-point touch, and recognizing the tap interaction at the other point, the electronic device can process the corresponding input by adjusting the level or the count. That is, upon recognizing one press and one tap interaction at the 2-point touch, the electronic device can recognize the corresponding touch interaction to be mapped to the count up and the count down. When such a touch interaction is recognized, the electronic device can process the volume up/down or the brightness up/down according to the running application. For a long press over a certain time instead of the tap in the volume control application, the electronic device may conduct a fast volume level control or accelerated upward/accelerated downward volume control in a corresponding direction.

Figure 19:
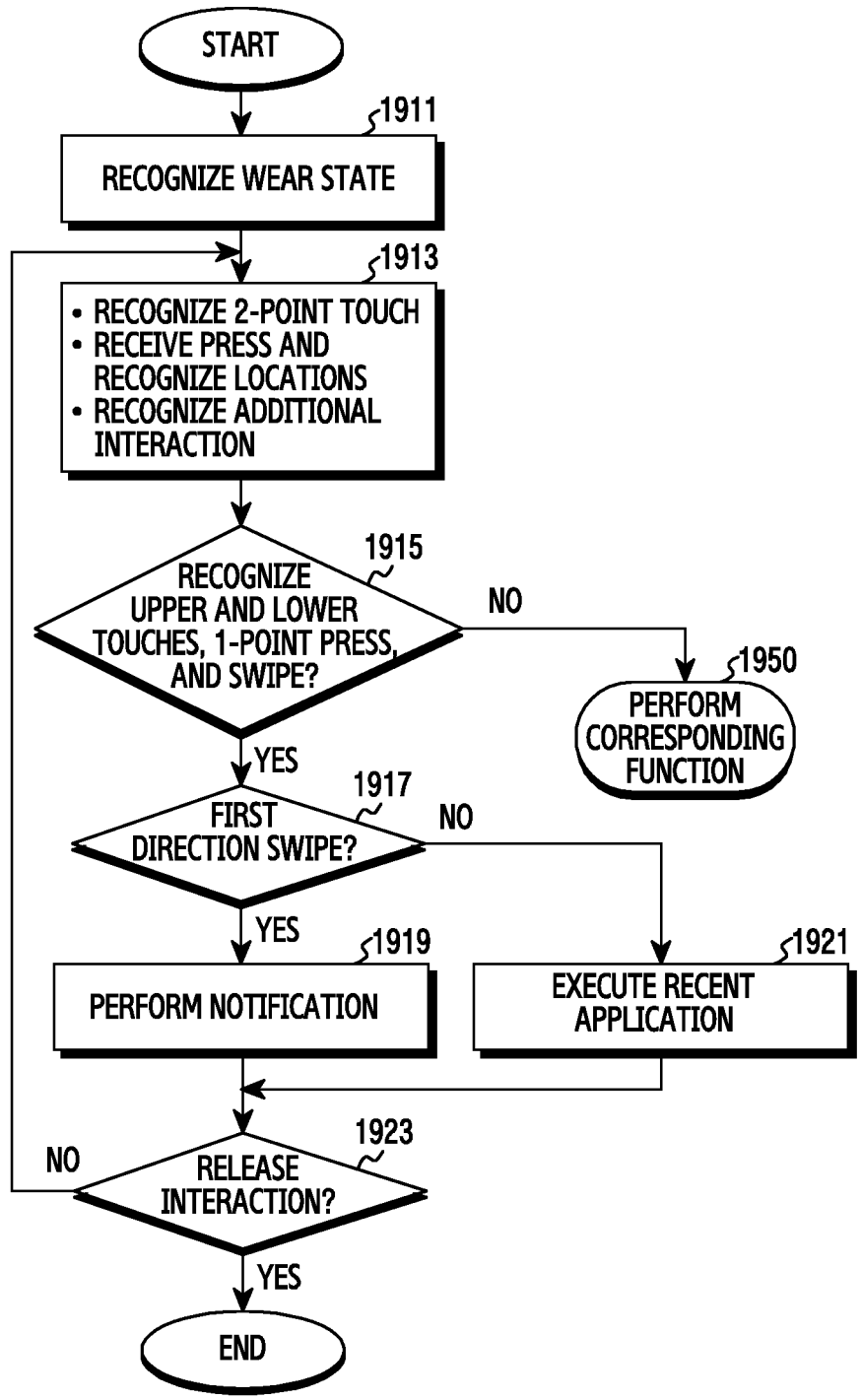
FIG. 19 illustrates a method for switching an application with an electronic device put on according to embodiments of the present disclosure.

FIG. 19 illustrates a method for switching an application with an electronic device put on according to embodiments of the present disclosure.

Referring to FIG. 19, the electronic device can recognize its wear state in operation 1911. In so doing, when a 2-point touch is input, the electronic device can detect locations of the 2-point touch, number and locations of presses, and an additional interaction in operation 1913. When the touch is input to the upper and lower sides, the press is recognized at one point of the 2-point touch, and a swipe interaction is detected at an untouched point, the electronic device can recognize the same in operation 1915. Upon recognizing the swipe interaction, the electronic device can locate the swipe interaction (or the pressed point) in operation 1917. When the swipe interaction is detected at a first direction (such as an upper point), the electronic device can execute a first application in operation 1919.

When the swipe interaction is detected at a second direction (such as a lower point), the electronic device can execute a second application in operation 1921. For example, the first application can be a quick panel (notification), and the second application can be a recent application. The quick panel (notification) application can notify information (communication information (call, messaging service (SMS, EMS, MMS), SNS), downloaded information) that has not been checked by the user. The recent application can display application lists recently executed by the user. When a release interaction occurs in operation 1923, the electronic device can recognize the release, stop displaying the first application or the second application, and switch to a previous application screen. Herein, the release interaction can include a touch interaction which touches the upper and lower sides, presses two points, and swipes inwards. When the release interaction is not recognized in operation 1923, the method returns to operation 1913. When any of the touch input to the upper and lower sides, the press at one point of the 2-point touch, and a swipe interaction detected at an untouched point are not recognized, the electronic device proceeds to operation 1950 to perform a corresponding function.

Figure 20:
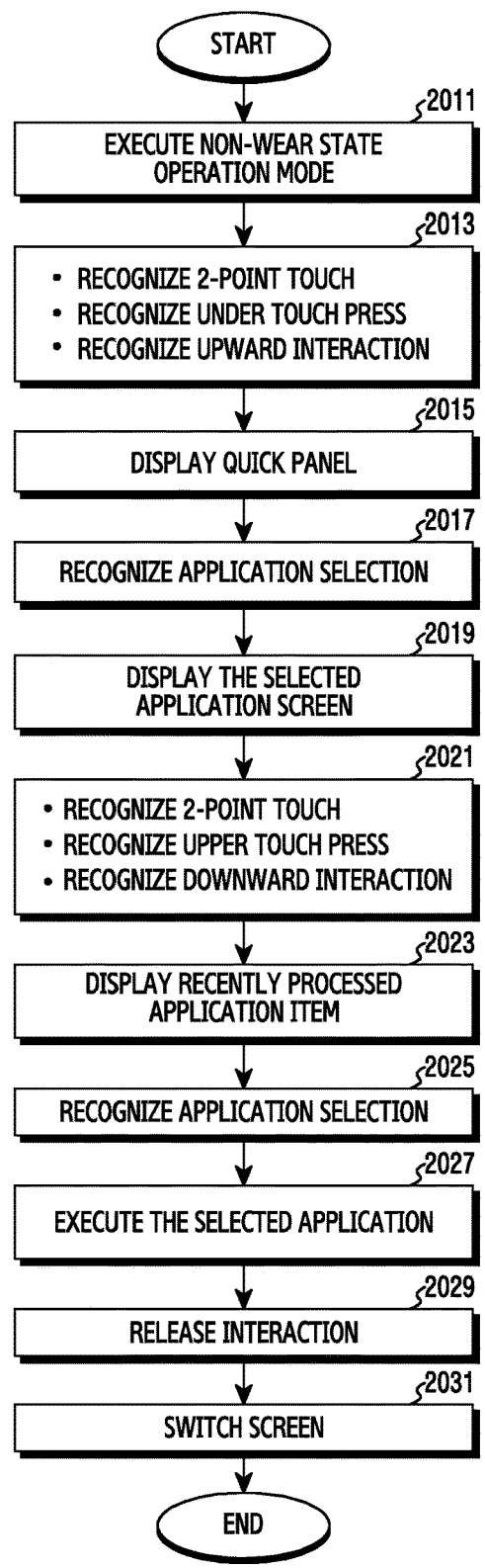
FIG. 20 illustrates a method for executing an application of FIG. 19.
Figure 21:
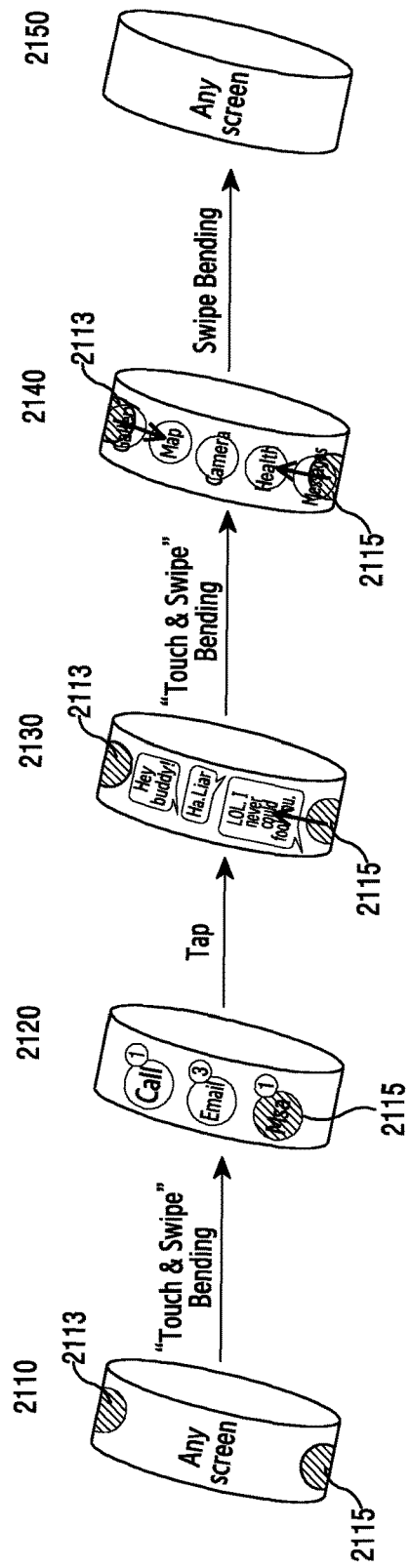
FIG. 21 illustrates a screen in operations of FIG. 20.

FIG. 20 illustrates a method for executing an application of FIG. 19. FIG. 21 depicts a screen in the operations of FIG. 20.

Referring to FIGS. 20 and 21, the electronic device can recognize its wear state in operation 2011. In the wear state, when a 2-point touch 2110 occurs at upper and lower sides, a lower point 2115 is pressed, and a swipe interaction occurs at an upper point 2113, the electronic device can recognize the locations of the 2-point touch, the number and locations of the presses, and swipe interactions in operation 2013. Upon detecting the touch interaction 2110, the electronic device can display the first application 2120 of the quick panel (notification) on the display 160 in operation 2015. When displaying the quick panel on the display 160, the electronic device can display the panel to move from upper to lower (or from lower to upper) positions on the display. The quick panel 2120 displays unanswered incoming communication information, and the number in the circle can indicate the number of missed/new notifications of the user.

When the quick panel 2120 is displayed and the user selects particular information 2125, the electronic device recognizes the selection 2017 and displays detailed screen information 2130 of the selected application on the display 160 in operation 2019. When the quick panel switches to the detailed screen of the selected application and the user inputs a swipe interaction at the lower point 2115 while touching the two points and pressing the upper point 2113, the electronic device can recognize this in operation 2021 and display lists of recent applications 2140 on the display 160 in operation 2023. The electronic device can display the recent applications as icons based on time. The user can select an intended list from the displayed recent application lists 2140. The electronic device can recognize the user's selected list in operation 2025 and execute an application of the selected list in operation 2027. When the user touches the upper point 2113 and the lower point 2115, presses the points, and then inputs an inward swipe interaction 2140, the electronic device can recognize this as a release interaction in operation 2029 and end the method by switch to the previous screen 2150 on the display 160 in operation 2031.

As shown in FIGS. 20 and 21, when recognizing the 2-point touch, the press at one of the two touched points, and the swipe interaction at the other point, the electronic device can switch to a preset application of the current application. That is, when detecting one press and the swipe interaction at the 2-point touch, the electronic device can recognize the corresponding touch interaction as being for switching to a particular preset application, such as the quick panel (notifications) and the recent application. The quick panel (notifications) is the touch interaction mapped to invoke the quick panel in a general electronic device, and can evoke the same user experience even in the electronic device of the wear state and invoke the quick panel in any screen. The recent applications can be invoked by the upward swipe interaction in any screen, and the applications can be switched easily even in the small screen of the wear state.

Figure 22:
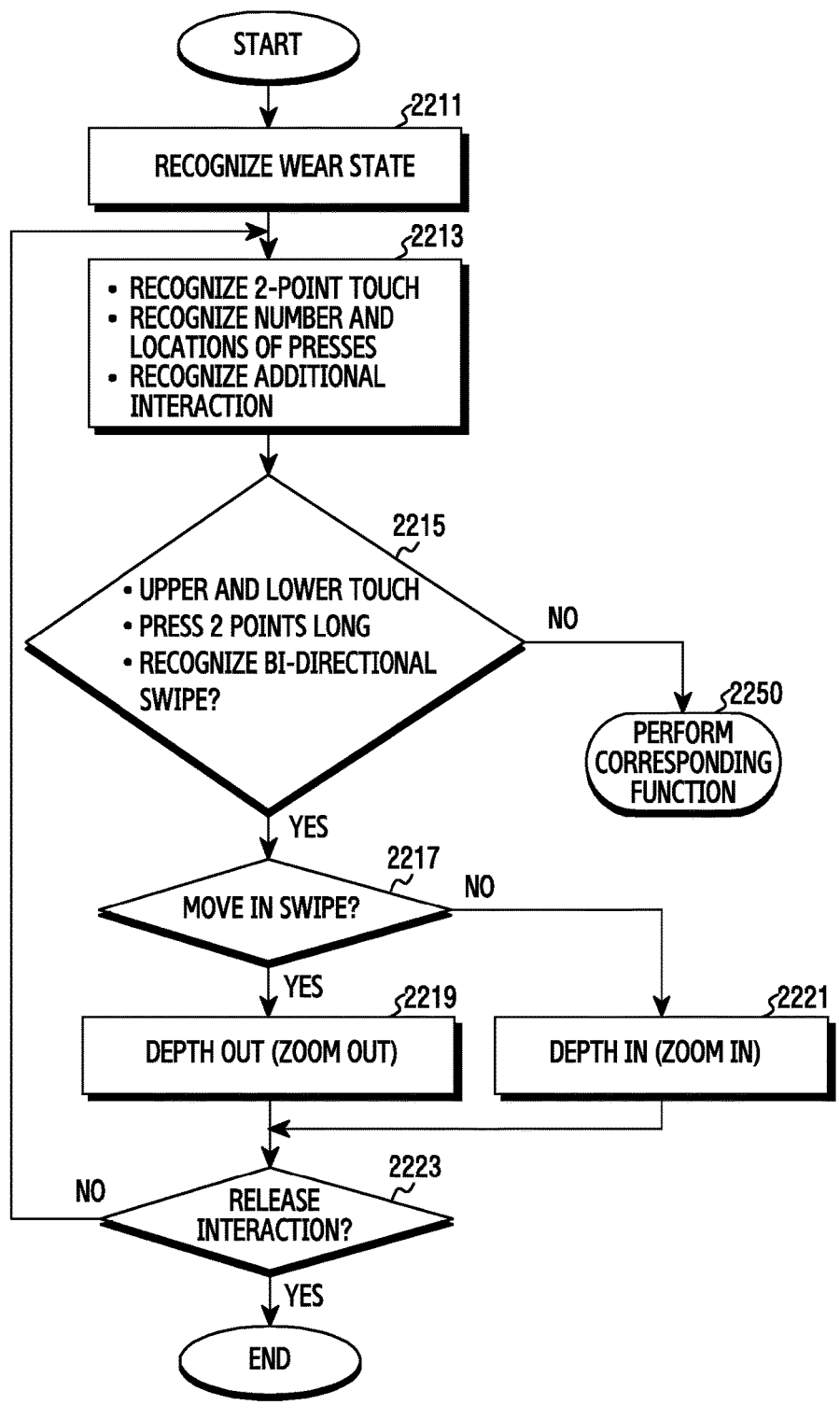
FIG. 22 illustrates a method for switching a screen of an application executed when an electronic device is put on according to embodiments of the present disclosure.

FIG. 22 illustrates a method for switching a screen of an application executed when an electronic device is put on according to embodiments of the present disclosure.

Referring to FIG. 22, the electronic device can recognize its wear state in operation 2211. When a 2-point touch, a 2-point press, and an additional interaction occur, the electronic device can recognize locations of the 2-point touch, number and locations of presses, and the additional interaction in operation 2213. When the 2-point touch is input to the upper and lower sides of the electronic device, the 2-point press is recognized, and a swipe interaction is detected at the 2-point touch, the electronic device can recognize them in operation 2215. Upon recognizing the swipe interaction, the electronic device can determine a direction of the swipe interaction in operation 2217. When the swipe interaction 631 moves in as shown in FIG. 6, the electronic device switches to a previous page (or a next page) in operation 2219. When the swipe interaction 623 moves out as shown in FIG. 6, the electronic device switches to a next page (or a previous page) in operation 2221. For example, when the current application has a plurality of depths, the electronic device can display a previous depth screen on the display 160 for the inward swipe, and display a next depth screen on the display 160 for the outward swipe in operation 2221.

When detecting a release interaction, the electronic device can recognize the release interaction 2223 and proceed to another operation of the wear state. When the release interaction is not detected, the method returns to operation 2213. When any of the 2-point touch input to the upper and lower sides of the electronic device, the 2-point press, and swipe interaction detected at the 2-point touch are not recognized, the electronic device proceeds to operation 2250 to perform a corresponding function.

When the 2-point touch 631 is detected at the upper and lower sides of the display 160, the 2-point touch is pressed, and the swipe moves in as shown in FIG. 6, the electronic device can recognize the corresponding touch interaction (use case: depth out (zoom out), cancel, back, etc.) in various manners according to the running application. For example, when detecting the touch interaction 631 of FIG. 6, the electronic device can switch a detail view of a gallery application to a thumbnail view, move to a previous page in an Internet browser, and switch to a previous depth screen in an application having a plurality of depths. The electronic device can move to the running application cancel/previous application. Gesture metaphor of the touch interaction 631 of FIG. 6 can pull the screen upwards from the electronic device and indicate 'level up' or 'back/cancel'.

When the 2-point touch 633 is detected at the upper and lower sides of the display 160, the 2-point touch is pressed, and the swipe moves out as shown in FIG. 6, the electronic device can recognize the corresponding touch interaction (use case: depth in (zoom in), next) in various manners according to the running application. For example, when detecting the touch interaction 631 of FIG. 6, the electronic device can switch the thumbnail view of the gallery application to the detail view to, move to a next page in the Internet browser, and switch to a next depth screen in the application having the plurality of the depths. Gesture metaphor of the touch interaction 631 of FIG. 6 can pull down the screen and indicate 'forward'.

Figure 23:
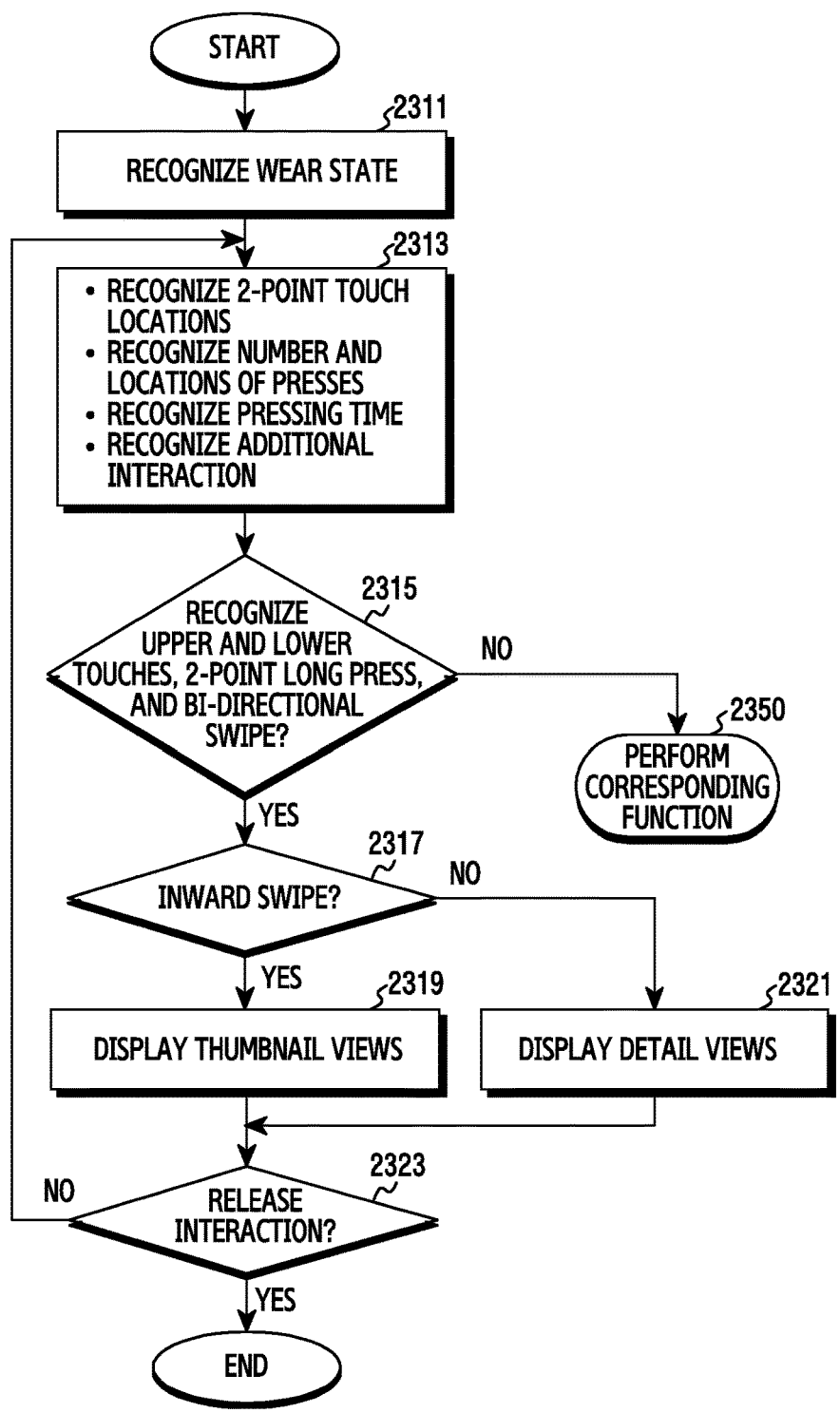
FIG. 23 illustrates application execution of FIG. 22.
Figure 24:
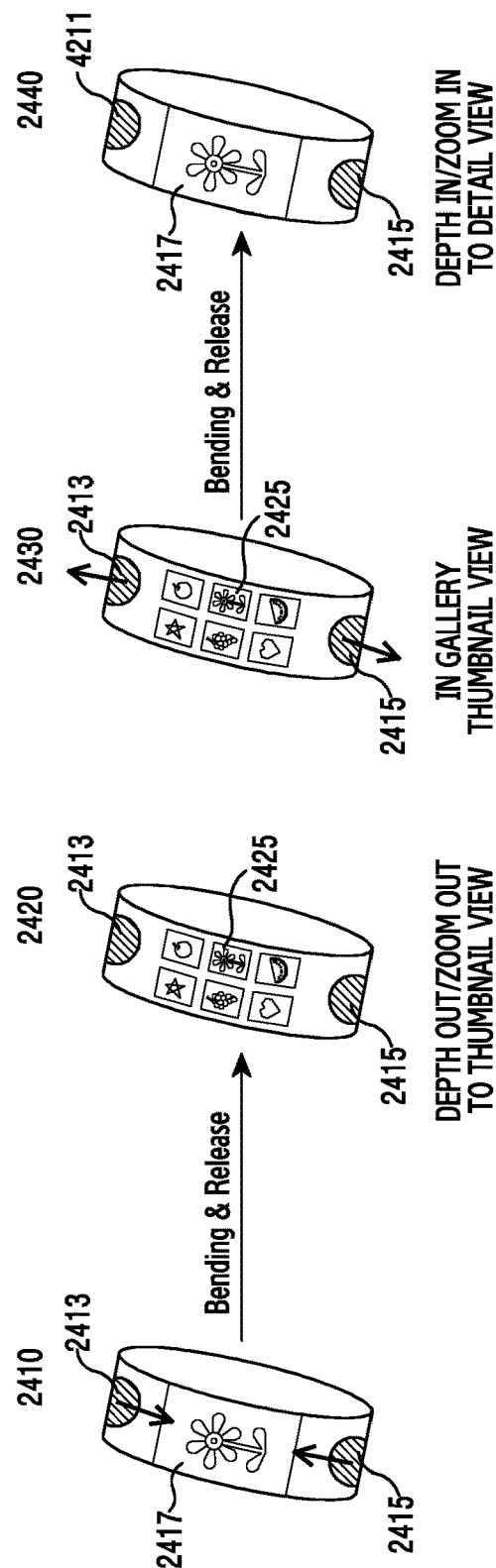
FIG. 24 illustrates a screen in operations of FIG. 23.

FIG. 23 illustrates application execution of FIG. 22. FIG. 24 depicts a screen in the operations of FIG. 23.

Referring to FIGS. 23 and 24, the electronic device can recognize its wear state in operation 2311. The electronic device can execute an image view application, such as a gallery application, in operation 2311. For example, the electronic device 2410 can display a detail view 2417 on the display 160 in operation 2311. When the user touches an upper point 2413 and a lower point 2415, presses the two points, and then inputs a swipe interaction at the 2-point touch, the electronic device can recognize these in operations 2313, 2315 and 2317. In so doing, when the swipe 2410 moves inward, the electronic device 2420 can recognize this in operation 2317 and display a thumbnail view 2425 on the display 160 in operation 2319. That is, when the gallery shows the detail view and the swipe interaction moves inward, the electronic device can switch to the thumbnail view 2425 which is displayed on the display 160, and when a release interaction is received at operation 2323, the interaction is released. When the release interaction is not received at operation 2323, the method returns to operation 2313.

When the user moves the swipe interaction outward, the electronic device 2440 can recognize this in operation 2317 and switch to the detail view screen 2417 on the display 160 in operation 2321. When any of the user touching an upper point 2413 and a lower point 2415, pressing the two points, and then inputting a swipe interaction at the 2-point touch are not recognized in operations 2313 and 2315, the electronic device proceeds to operation 2350 to perform a corresponding function.

Figure 25:
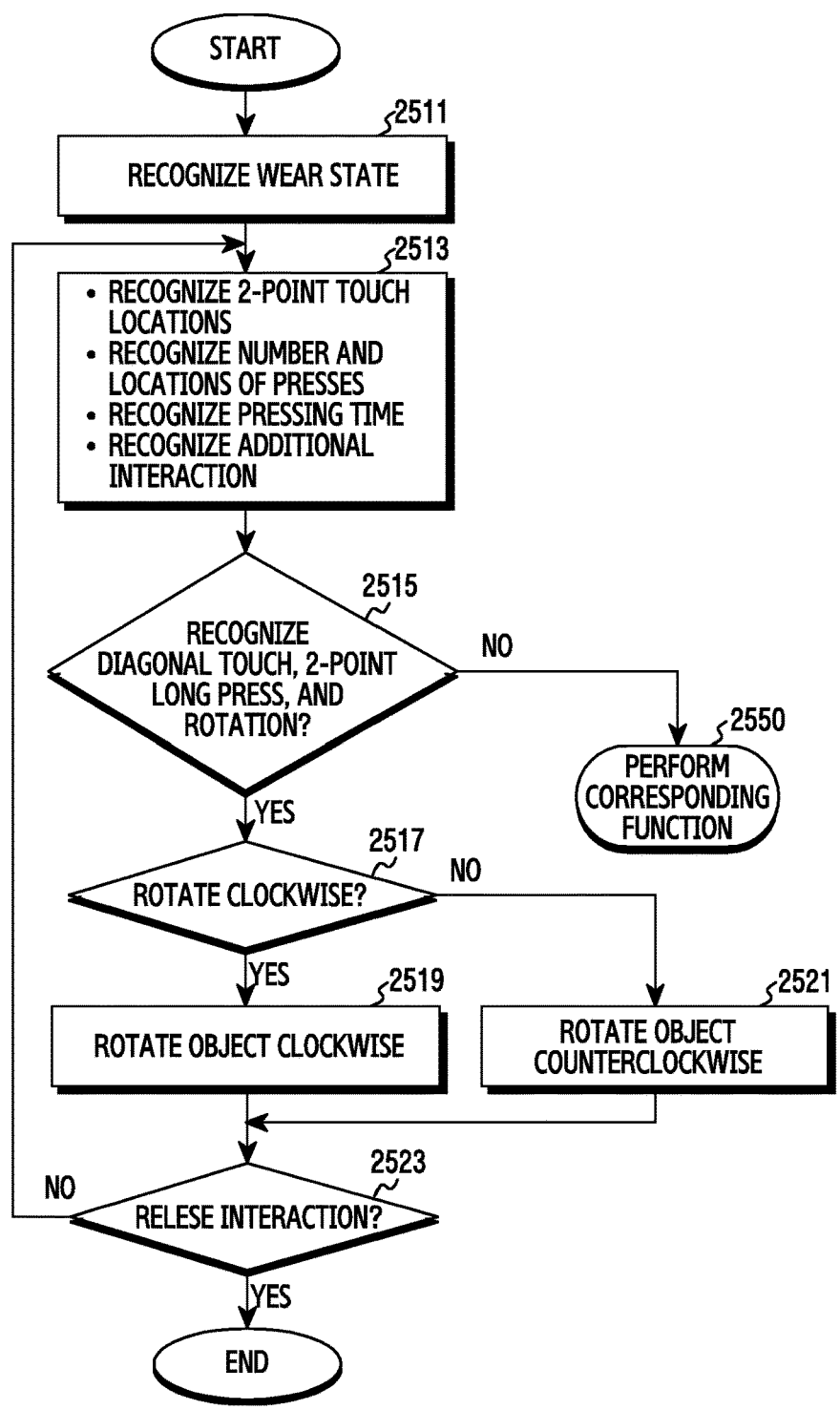
FIG. 25 illustrates a method for processing a diagonal touch interaction when an electronic device is put on according to embodiments of the present disclosure.
Figure 26A:
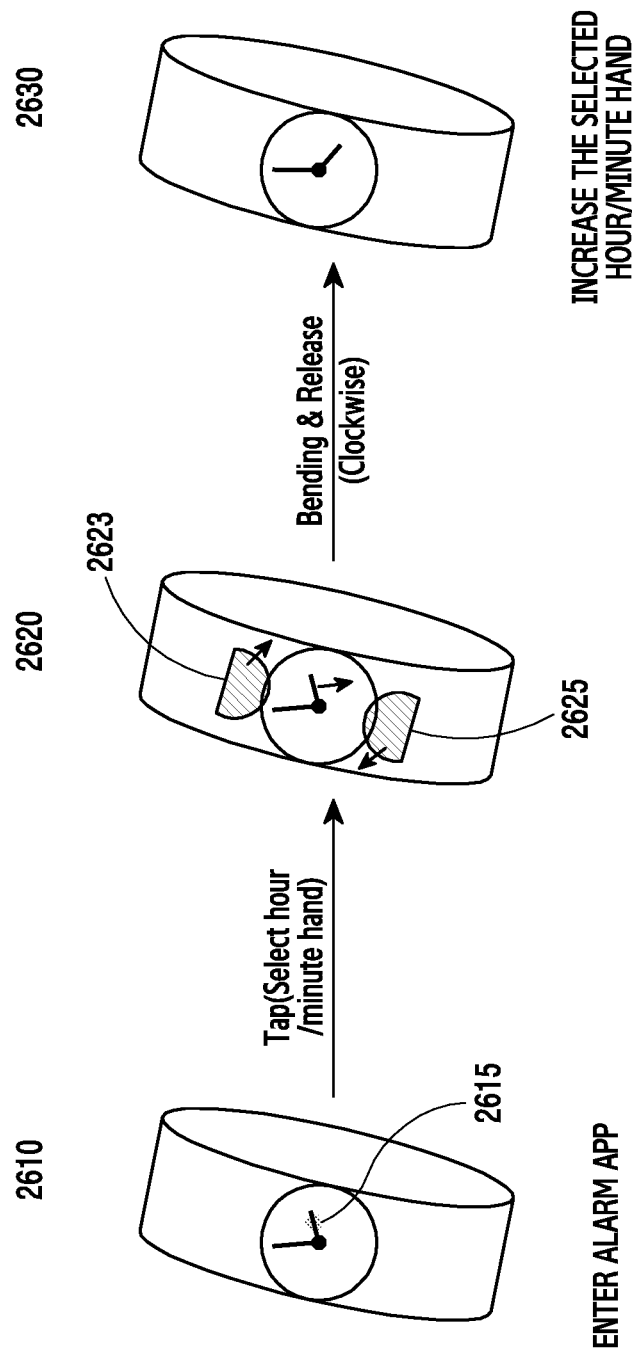
FIGS. 26A and 26B illustrate touch interactions of FIG. 25.
Figure 26B:
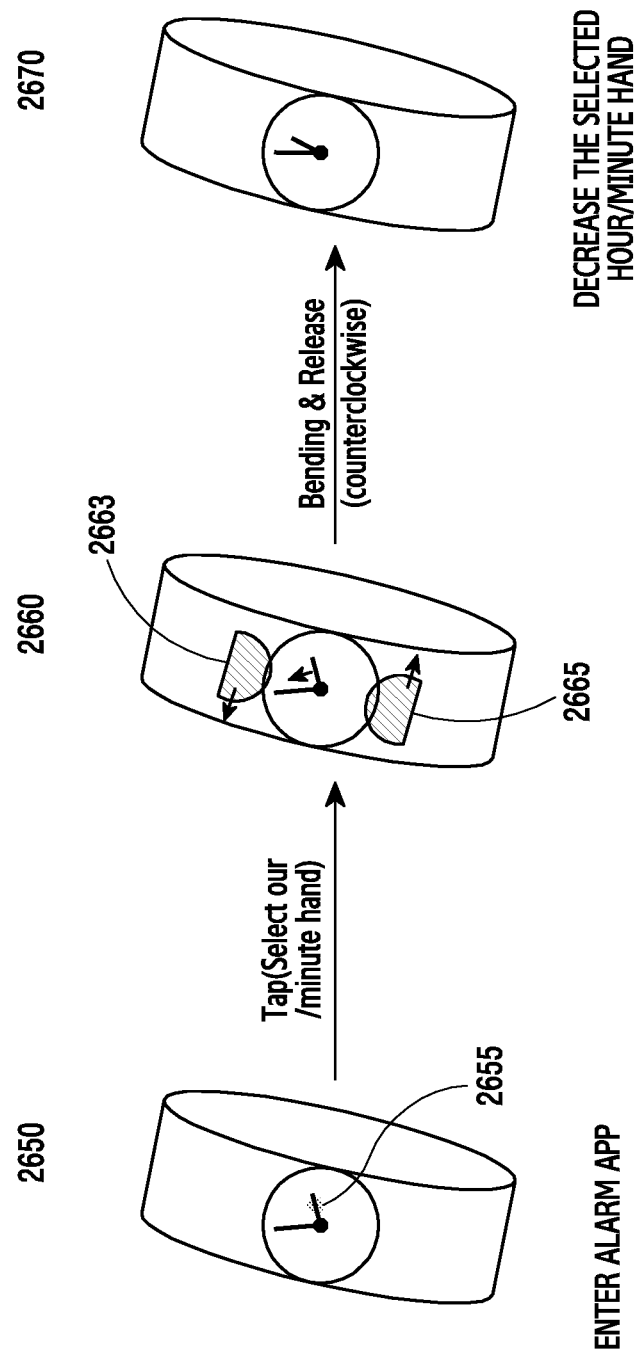

FIG. 25 illustrates a method for processing a diagonal touch interaction when an electronic device is put on according to embodiments of the present disclosure. FIGS. 26A and 26B depict touch interactions of FIG. 25.

Referring to FIG. 25, the electronic device can recognize its wear state in operation 2511. When a 2-point touch occurs in the wear state, the electronic device can detect locations of the 2-point touch, number and locations of presses, and an additional interaction in operation 2513. When the touch points are diagonal and the additional interaction is a rotation interaction, the electronic device can recognize these in operation 2515 and analyze a rotation direction in operation 2517. When the rotation interaction is clockwise, the electronic device can rotate an object clockwise in operation 2519. When the rotation interaction is counterclockwise in operation 2517, the electronic device can rotate the object counterclockwise in operation 2521. When a release interaction occurs, the electronic device can recognize this in operation 2523 and finish the touch interaction processing. When the release interaction does not occur, the method returns to operation 2513. When any of the touches, press and rotation in operation 2515 are not recognized, the method proceeds to operation 2550 to perform a corresponding function, The electronic device can display a watch screen 2610 of FIG. 26A or a watch screen 2650 of FIG. 26B in operation 2511. When the user selects an object, such as the hour hand on the watch screen 2610 or 2650, touches and presses two diagonal points, and inputs a rotation interaction, the electronic device can recognize these in operation 2513 and recognize the rotation direction in operation 2515. When the user touches and presses diagonal points 2623 and 2625 and inputs a clockwise rotation interaction, the electronic device can recognize these in operation 2515 and rotate the selected object, such as the hour hand, clockwise in operation 2519. When the user touches and presses diagonal points 2663 and 2665 and inputs a counterclockwise rotation interaction, the electronic device can recognize these in operation 2515 and rotate the selected object counterclockwise in operation 2519.

For example, upon detecting the touch interaction 631 of FIG. 6, the electronic device can switch the thumbnail view of the gallery application to the detail view to, move to a next page in the Internet browser, and switch to a next depth screen in the application having the plurality of the depths. The gesture metaphor of the touch interaction 631 of FIG. 6 can pull down the screen and indicate 'forward'.

For example, when detecting the diagonal touch 613 or 615 of FIG. 6 and the rotation interaction, the electronic device can adjust the hour and the minute in the watch application. Upon detecting the touch interaction 2620 of FIG. 26A, the electronic device can use this as 'increase', such as alarm create, in the time set. The gesture metaphor of the touch interaction 2620 can rotate clockwise and indicate 'increase'.

For example, upon detecting the touch interaction 2660 of FIG. 26A, the electronic device can use this as 'decrease' in the time set. The gesture metaphor of the touch interaction 2660 can rotate counterclockwise and indicate 'decrease'.

According to embodiments of the present disclosure, a method for operating an electronic device can include recognizing a wear state of the electronic device which comprises a flexible display, when the electronic device is worn, recognizing a multi-touch, a press, and/or a touch interaction comprising an additional interaction, and controlling a function and/or an object according to the touch interaction.

Recognizing the touch interaction can include, when detecting a multi-touch input, activating a press sensor, and when detecting at least one press from multi-touch inputs, detecting whether an additional interaction occurs. The multi-touch input can be a 2-point touch input, and recognizing the touch interaction can further include, when detecting a 2-point touch input, recognizing a touch location.

When the touch location is on upper and lower sides of the electronic device and a press is recognized at the 2-point touch locations, controlling can execute a voice input mode by activating a microphone. Executing the voice input mode can include recognizing a distance between the electronic device and a user in the voice input mode, and when the electronic device and the user are close to each other, executing the voice input mode in a whisper mode.

When the touch location is on front and rear sides of the electronic device and a press is recognized at a location comprising a medical sensor, controlling can include execute a biometric mode by activating the medical sensor, and when the press of the touch input is released, finishing the biometric operation.

When the touch location is on upper and lower sides of the electronic device, a press is recognized at one of the touch locations, and a tap interaction is detected at the other touch location, controlling can control a volume or a screen brightness according to the number of detected taps. When the touch location is on upper and lower sides of the electronic device, a press is recognized at one of the touch locations, and a swipe interaction is detected at the other touch location, controlling can switch to a preset application according to a swipe direction.

When the touch location is on upper and lower sides of the electronic device, a press is recognized at one of the touch locations, and a swipe interaction is detected at the other touch location, controlling can switch to a preset application according to a swipe direction. Controlling and further include, when the swipe interaction moves inward controlling can display a quick panel screen on the display, and displaying an application of a selected list as a detail screen in the quick panel screen. Controlling can further include, when the touch location is on upper and lower sides of the electronic device, a press is recognized at the two touch locations, and a swipe input is detected, finishing the quick panel screen display. Controlling and further include, when the swipe interaction moves outward controlling can display a list screen of recent applications on the display, and displaying an application of a list selected in the recent application list screen. Controlling can further include, when the touch location is on upper and lower sides of the electronic device, a press is recognized at the two touch locations, and an inward swipe input is detected, finishing the recent application screen display.

Controlling can include, when the touch location is on upper and lower sides of the electronic device, a press is recognized at the two touch locations, and a swipe interaction is detected, performing a preset function according to a swipe direction. Controlling can further include displaying a previous depth screen for an inward swipe direction, and displaying a next depth screen for an outward swipe direction. Controlling can, when touch locations are diagonal, a press is recognized at the two touch locations, and a rotation interaction is detected, move a selected object in a rotation direction.

As set forth above, when the user wears the flexible electronic device which can change into a phone or a wearable device, the electronic device and its operating method according to embodiments of the present disclosure can combine the number of the touches, the number of the presses, and the interactions, and thus control the function and/or the object. Thus, when the user wears and then touches the electronic device, haptic feedback is added based on the physical change of the electronic device and an intuitive and sensitive output can be provided.

While the present disclosure has been shown and described with reference to certain embodiments thereof, it will be understood by those skilled in the art that various changes in form and details may be made therein without departing from the spirit and scope of the disclosure as defined by the appended claims and their equivalents.

What is claimed is:

1. An electronic device comprising:
   a memory storing instructions;
   a flexible display;
   a touch panel;
   at least one sensor; and
   at least one processor configured to execute the storing instructions to:
      identify a wearing state of the electronic device by using the at least one sensor;
      based on the identification, obtain, by using the at least one sensor, information regarding a motion of the electronic device;
      in response to detecting a touch input on the touch panel while obtaining the information regarding the motion of the electronic device, obtain information regarding the touch input;
      identify, among a plurality of interactions configured in the electronic device, an interaction corresponding to the information regarding the motion of the electronic device and the information regarding the touch input; and
      provide a function corresponding to the identified interaction.

2. The electronic device of claim 1, wherein, the plurality of interactions are configured based on a type of at least one touch input received through the touch panel, a location of at least one touch input received through the touch panel, a number of at least one touch received through the touch panel, a time during which at least one touch input is maintained on the touch panel, a pressure of at least one touch input received through the touch panel, or a motion of the electronic device,
   wherein the plurality of interactions are configured by different combinations.

3. The electronic device of claim 2, wherein, in response to detecting a multi-touch input comprising at least two touch inputs, activating the at least one sensor, and
   in response to detecting at least one pressure from the multi-touch inputs, determining whether an additional interaction occurs and recognizing the interaction based on the determination.

4. The electronic device of claim 3, wherein the multi-touch input is a 2-point touch input, and
   in response to a 2-point touch input recognizing the touch location.

5. The electronic device of claim 4, wherein, in response to the touch location on upper and lower sides of the electronic device and recognizing a pressure at the 2-point touch locations, activating a microphone and executing a voice input mode, and
   in response to recognizing a user in the voice input mode, executing the voice input mode as a whisper mode.

6. The electronic device of claim 4, wherein, in response to the touch location on front and rear sides of the electronic device and recognizing a pressure at a location comprising a biometric sensor, activating the biometric sensor and executing a biometric mode.

7. The electronic device of claim 4, wherein, in response to the touch location on upper and lower sides of the electronic device, recognizing a pressure at one of the touch location at the upper and lower sides, and detecting a tap interaction at another of the upper and lower sides, controlling a volume based on the number of detected taps.

8. The electronic device of claim 4, wherein, in response to the touch location on upper and lower sides of the electronic device, recognizing a pressure at the touch location at one of the upper and lower sides, and detecting a swipe interaction at another of the upper and lower sides, and switching to a preset application based on a swipe direction.

9. The electronic device of claim 4, wherein, in response to the touch location on upper and lower sides of the electronic device, recognizing a pressure at the touch location on the upper and lower sides, and detecting a swipe interaction, performing a preset function based on a swipe direction.

10. The electronic device of claim 4, wherein, in response to recognizing a pressure at two diagonally opposed locations, and detecting a rotation interaction, moving a selected object in a rotation direction.

11. A method for operating an electronic device comprising a flexible display, the method comprising:
   according to a wearing state of the electronic device, recognizing a touch interaction comprising a multi-touch input including two or more touch inputs, a pressure of each touch input of the multi-touch, and an additional interaction; and
   controlling at least one of a function and an object according to the touch interaction;
   wherein the additional interaction comprises a movement of at least one of the touch input of the multi-touch or a movement of the electronic device.

12. The method of claim 11, wherein recognizing the touch interaction comprises:
   in response to detecting the multi-touch input, activating at least one sensor; and
   in response to detecting at least one pressure from the multi-touch inputs, determining whether an additional interaction occurs.

13. The method of claim 12, wherein the multi-touch input is a 2-point touch input, and
   in response to detecting a 2-point touch input, recognizing a touch location.

14. The method of claim 13, wherein, in response to the touch location on upper and lower sides of the electronic device and recognizing a pressure at the 2-point touch locations, executing a voice input mode by activating a microphone.

15. The method of claim 14, wherein executing the voice input mode comprises:
   recognizing a distance between the electronic device and a user in the voice input mode; and
   in response to the electronic device and the user recognized as close to each other, executing the voice input mode in a whisper mode.

16. The method of claim 13, wherein controlling the at least one of a function and an object comprises:
   in response to the touch location is on front and rear sides of the electronic device and recognizing a pressure at a location comprising a biometric sensor, executing a biometric mode by activating the biometric sensor; and
   in response to release of the pressure of the touch input, ending the biometric operation.

17. The method of claim 13, wherein controlling the at least one of a function and an object comprises:
   in response to the touch location on upper and lower sides of the electronic device, recognizing a pressure at one of the touch locations on the upper and lower sides, and detecting a tap interaction detected at the another touch location of the upper and lower sides, controlling a volume or a screen brightness based on the number of detected taps.

18. The method of claim 13, wherein controlling the at least one of a function and an object comprises:
   in response to the touch location on upper and lower sides of the electronic device, recognizing a pressure at one of the touch locations on the upper and lower sides, and detecting a swipe interaction at the another touch location of the upper and lower sides, switching to a preset application based on a swipe direction.

19. The method of claim 13, wherein controlling the at least one of a function and an object comprises:
   in response to the touch location is on upper and lower sides of the electronic device, recognizing a pressure at the two touch locations, and detecting a swipe interaction, performing a preset function based on a swipe direction.

20. The method of claim 13, wherein controlling the at least one of a function and an object comprises:
   in response to diagonally opposed touch locations, recognizing a pressure at the two touch locations, and detecting a rotation interaction, moving a selected object in a rotation direction.

* * * * *